June 26, 1962  J. SUOZZO ETAL  3,040,838
ELEVATOR CONTROL SYSTEMS
Filed April 25, 1960  8 Sheets-Sheet 2

Terminal Circuits

United States Patent Office 3,040,838
Patented June 26, 1962

3,040,838
ELEVATOR CONTROL SYSTEMS
John Suozzo, Paramus, and William R. Caputo, Jersey City, N.J., assignors to Westinghouse Electric Corporation, East Pittsburgh, Pa., a corporation of Pennsylvania
Filed Apr. 25, 1960, Ser. No. 24,304
38 Claims. (Cl. 187—29)

This invention relates to elevator control systems and it has particular relation to elevator control systems employing static components.

In prior art elevator control systems, relatively movable parts such as movable carriages, brush assemblies, motor mechanisms, sliding contacts and relays generally have been employed. Each of these parts involves a maintenance and performance problem. A proposal to employ static components in an elevator floor selector will be found in the Hall et al. Patent 2,806,554.

In accordance with the invention, an elevator control system is constructed substantially of static components. In a preferred embodiment of the invention, the control system is constructed from building blocks or logic elements each having two stable states. As examples of preferred building blocks, reference will be made to NOR, OR, MEMORY and DELAY elements.

A NOR element produces an output only while no energization is supplied to its input terminals. Thus, a NOR element having plural inputs may be designed to provide an output only if none of its inputs is energized. Conversely, if any of such inputs is energized the NOR element has no output.

The OR element has an output dependent on a plurality of conditions. The relationship may be such that the OR element has an output if any of the conditions is present. Thus, an OR element having plural inputs may be designed to supply an output only if energy is supplied thereto through any of its inputs.

A MEMORY element also is referred to as a "flip-flop." In response to a first condition, the MEMORY element produces an output which is maintained even though the first condition thereafter is discontinued. The MEMORY element is reset and the output terminated in response to a second condition. Conveniently, a MEMORY element may comprise a pair of NOR elements interconnected in such a way as to produce the aforementioned response.

As its name implies, the DELAY element interposes a delay between the application thereto of an input signal and the production thereby of an output. Thereafter the output may continue until the input signal is terminated.

In a preferred embodiment of the invention, the aforenamed static logic elements are associated in a separate group or unit for each landing or floor served by an elevator car. Each unit contains the circuits associated with its particular floor, such as landing selector, call registration and cancelling, stopping, car direction and door-opening circuits. The units associated with the lower and upper terminal floors served by the elevator car are identical to each other; and the units associated with floors intermediate the lower and upper terminal floors are identical to one another.

In addition to the aforementioned floor groups or units, a terminal circuit group or unit of static logic elements is provided. Circuits which are common to the per-floor units are completed on the terminal circuit unit. These are the individual door-control signals, the call above and call below signals and the individual stopping signal circuits. Thus, the terminal circuit group of static elements provides signals for controlling the elevator car door, for stopping the car and for controlling the direction of car travel.

Conveniently, the floor and terminal circuit units may be installed in a relatively compact cabinet or rack. The cabinet may comprise pairs of guides or tracks, each of the pairs receiving one of the groups of static elements. Additionally, the rack may be provided with an end board having plug-in connections for each of the groups of static elements, each of the groups having plug-in connections for mating with their respective associated plug-in connections of the end board. It will be apparent that such an arrangement results in increased ease of servicing and maintenance of an elevator control system, since any group of static elements may be removed from the rack and a new unit of identical elements inserted in its place.

While the cabinet or rack may be designed for an elevator system serving a predetermined maximum number of floors, for example eight floors, the same rack may be employed for an elevator system serving fewer than eight floors. In the latter instance, floor groups of static elements are inserted only in the same number of pairs of guides or tracks as there are floors served by the system, the remaining floor tracks being left vacant. The eight-floor rack mentioned above would include tracks for the lower and upper terminal floors and for six intermediate floors. Thus, for an elevator system serving a total of five floors three pairs of floor tracks would be left vacant.

It is, therefore, an object of the invention to provide an elevator system having an improved control system.

It is a further object of the invention to provide an improved elevator control system constructed substantially of static logic elements.

It is another object of the invention to provide an elevator control system as specified in the preceding paragraph wherein the static elements include NOR elements.

It is also an object of the invention to provide a flexible and convenient mounting for the control elements of an elevator system.

It is an additional object of the invention to provide a standard rack or cabinet for an elevator control system which may be employed for elevator systems serving various numbers of floors.

Other objects of the invention will be apparent from the following description taken in conjunction with the accompanying drawings, in which.

Figure 1:
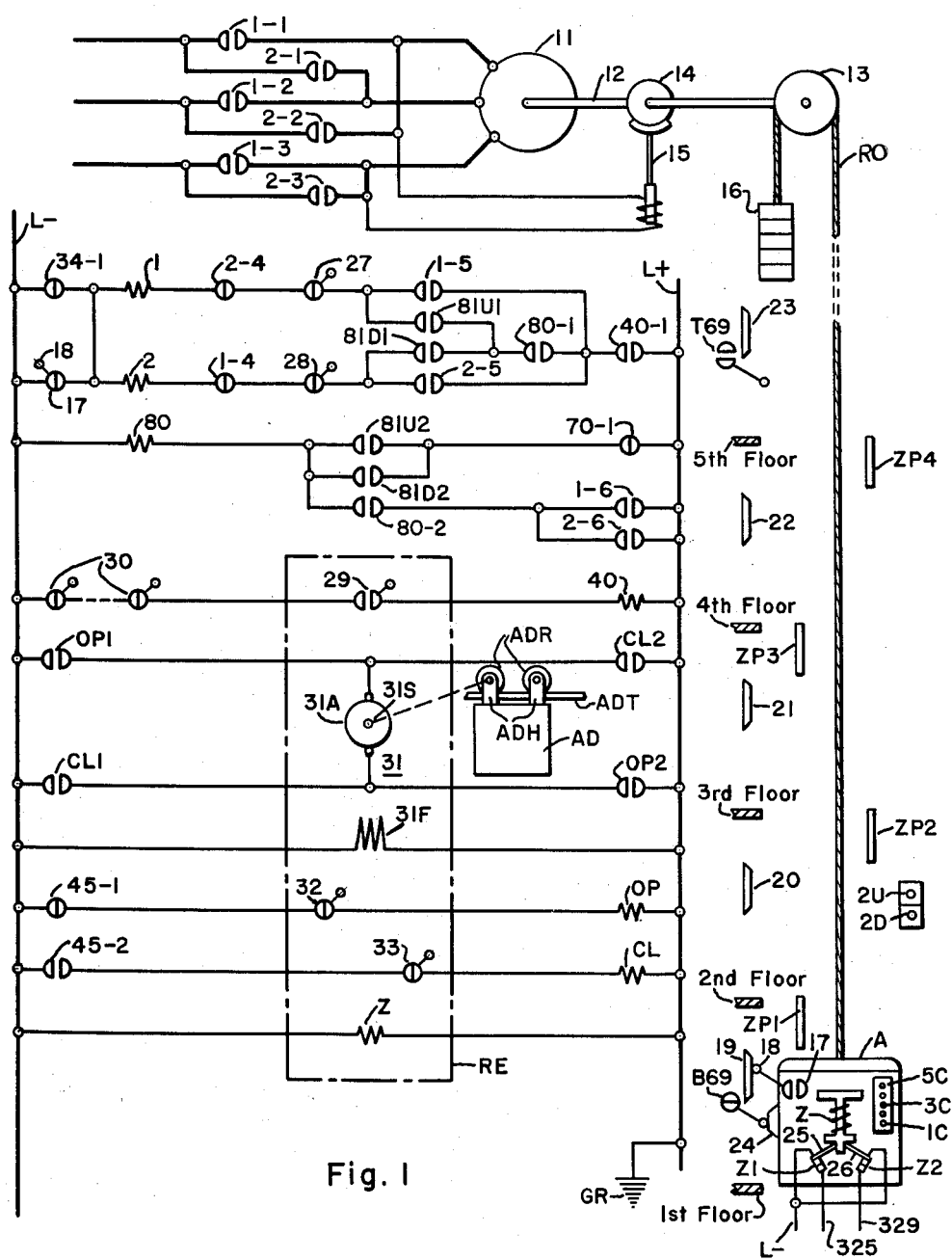
FIGURE 1 is a schematic view with parts broken away and parts not shown of an elevator system, including control circuits shown in straight-line form, in which the invention may be incorporated.
Figure 6A:
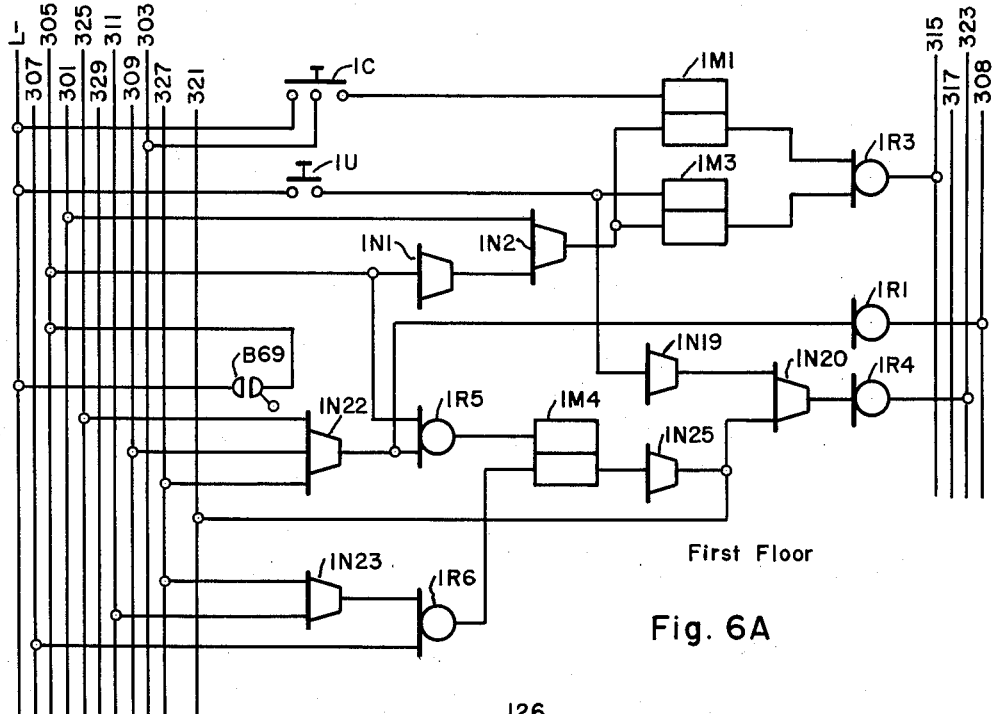
Figure 5:
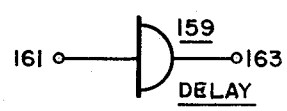
FIG. 5 is a symbolic representation of a DELAY element.
Figure 6B:
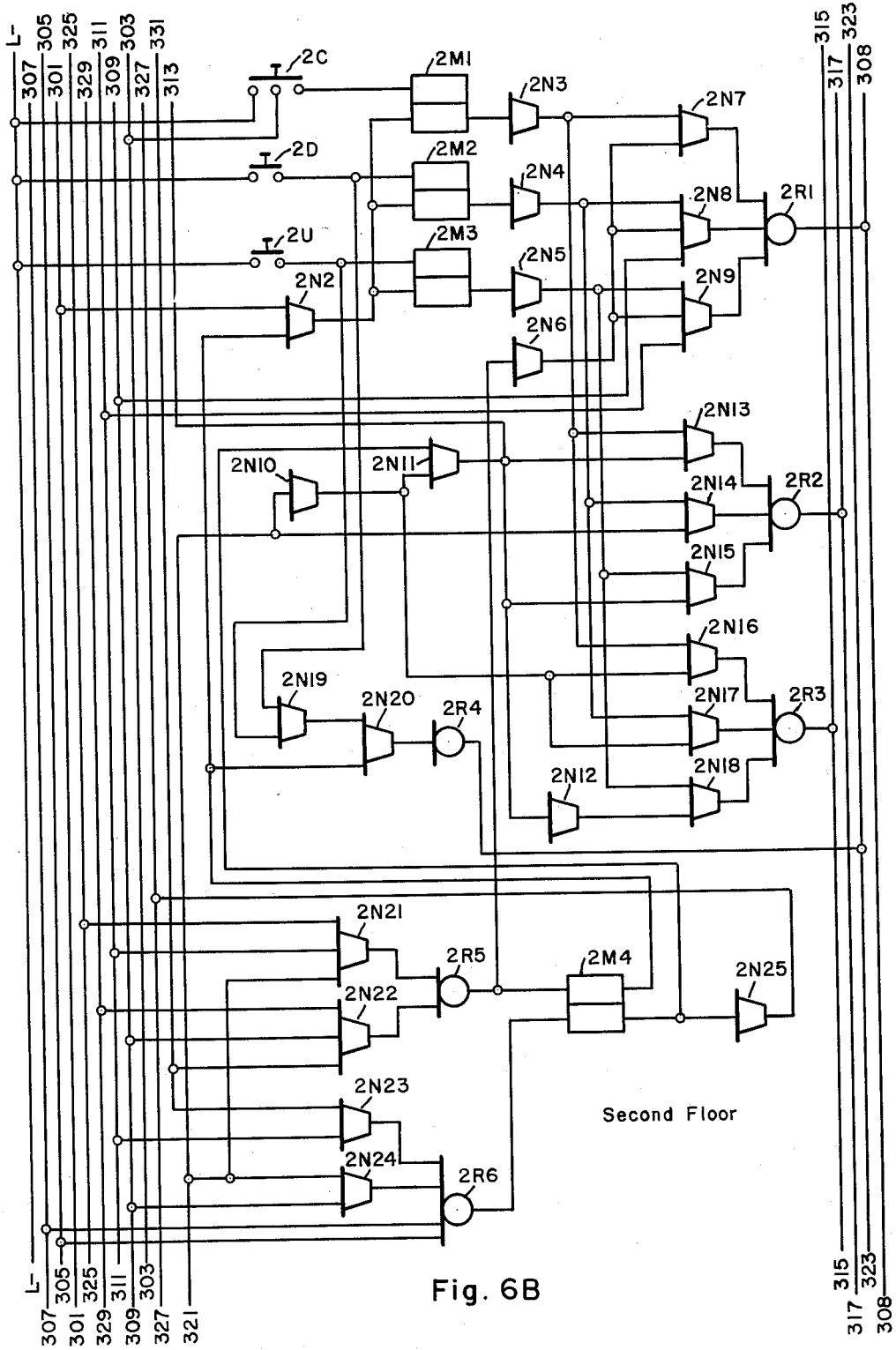
Figure 6C:
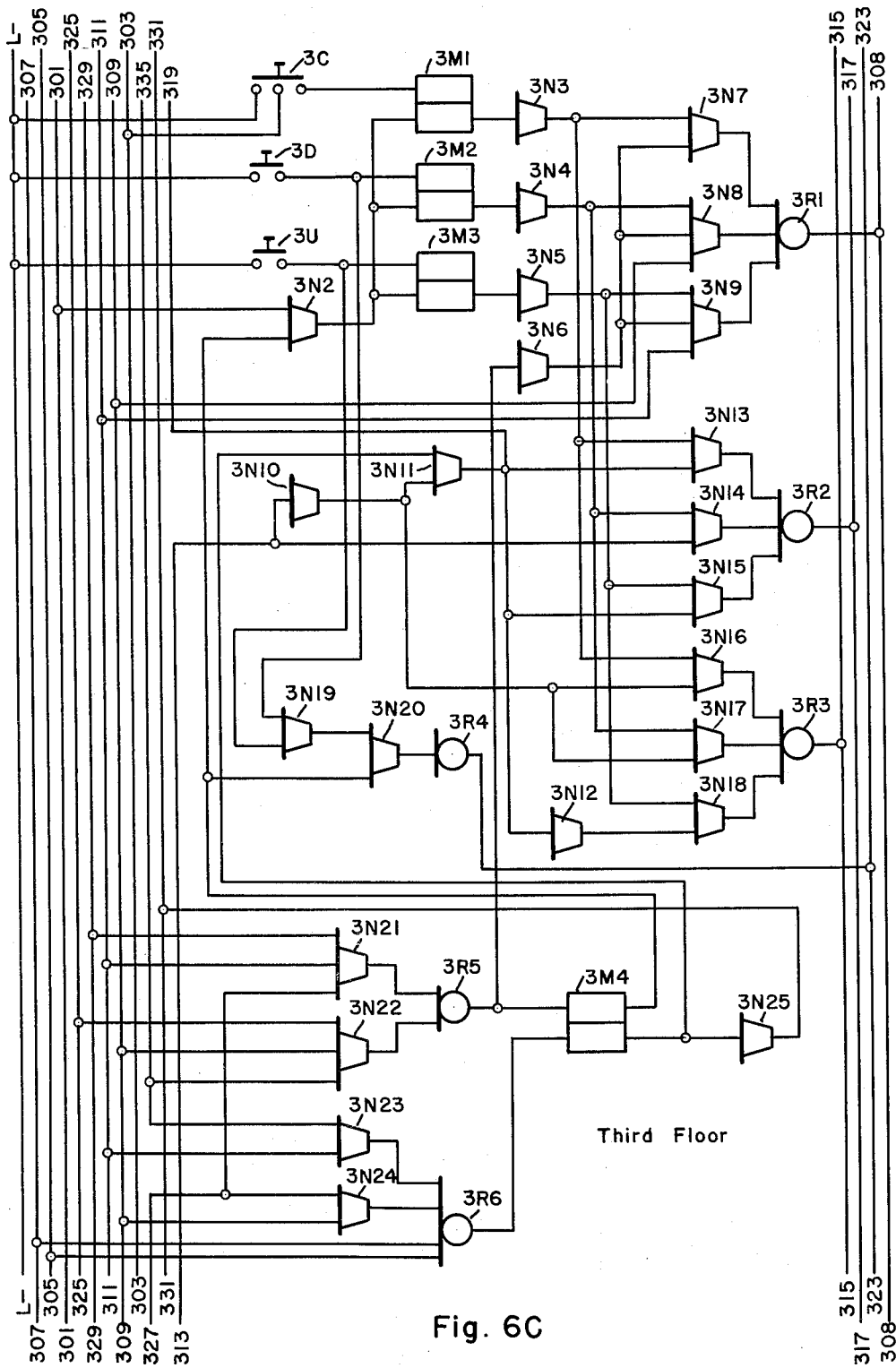
Figure 6D:
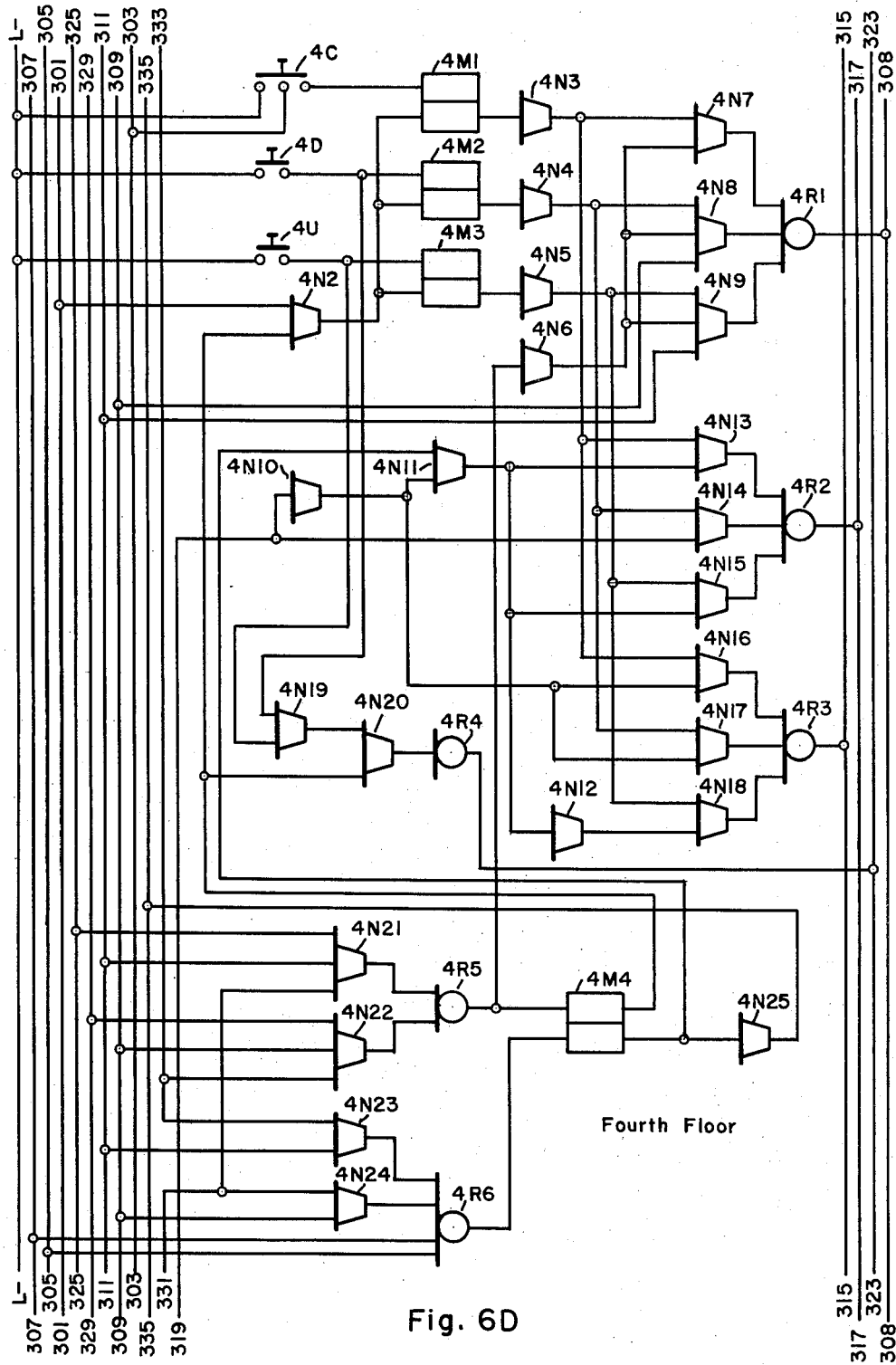

FIGS. 6A through 6F are schematic views in single-line form of additional control circuits suitable for the elevator system in FIG. 1 and embodying the static elements of FIGS. 2A through 5. These figures show different portions of the same control system and should be arranged with each one located below the next in order to depict the complete control system; and FIG. 7 is a perspective view in elevation with parts broken away and parts not shown of a cabinet or rack embodying the invention.

Although aspects of the invention may be incorporated in an elevator system arranged either for attendant operation or for automatic operation and serving a structure having any desired number of floors, the invention may be described adequately with reference to an elevator system arranged for fully automatic operation and serving a building structure having five floors. For this reason, the illustration and description of the invention will be directed particularly to such a system.

Though the majority of the components in the control system to be described comprise static elements, some electromagnetic switches and relays are employed in conjunction with such static elements to perform certain control functions. These switches and relays may have numerous contacts. For this reason, each of the sets of contacts of a relay or switch is identified by the reference character employed for the relay or switch followed by a numeral or suffix indicating the specific set of contacts. For example, the reference characters OP1 and OP2 indicate, respectively, the first and second sets of contacts for the door open relay OP.

Two types of contacts are employed for the switches and relays. One type may be referred to as back or break contacts. Such contacts are closed when the associated switch or relay is deenergized and dropped out; the contacts are open when the associated switch or relay is energized and picked up.

The second type of contacts may be referred to as front or make contacts. Such contacts are open when the associated switch or relay is deenergized and dropped out and are closed when the associated switch or relay is energized and picked up.

For reference purposes, the following list of switches and relays is set forth:

1—Up switch
2—Down switch
34—Stopping relay
40—Door safety relay
45—Door master relay
70—Non-interference relay
80—Master call relay
81U—Up direction preference relay
81D—Down direction preference relay
OP—Door open relay
CL—Door close relay
Z—Inductor notching relay In order to present the invention in an orderly manner, the apparatus and control circuits for each of the figures will be discussed separately. Thereafter, a number of typical operations of the entire system will be considered.

*Figure 1*

FIGURE 1 illustrates the association of an elevator car A with the building or structure served by the elevator system. The car A is assumed to be stopped at the first floor of the building.

The building is provided with a penthouse (not shown) having a floor on which certain apparatus of the elevator system is mounted. Thus, for the car A, an electric motor 11 is provided having a shaft 12 on which is mounted a traction sheave 13 and a brake drum 14. A brake 15 of the spring-applied magnetically-released type commonly employed for elevator systems cooperates with the brake drum 14 to stop or permit rotation of the motor 11.

The elevator car is connected to a counter weight 16 through one or more flexible ropes or cables RO which pass over the sheave 13.

Movement of the elevator car A is utilized to operate certain mechanical switches. To this end, a switch 17 is secured to the car. This switch is biased to its closed position and has a cam follower 18, which is disposed to engage cams 19, 20, 21, 22 and 23. These cams are mounted in the hoistway within which the elevator car operates. Thus, as the car travels up and down the hoistway the cam follower 18 engages its associated cams to open the switch 17 when the car is in predetermined positions. Opening of the contacts of the switch 17 in this manner is utilized to control stopping operations of the elevator car at the various floors of the structure which it serves.

In addition, there is mounted on the elevator car a cam 24 for the purpose of engaging cam followers of mechanical switches B69 and T69. These switches are biased to their open positions. The cam 24 engages the cam follower for the switch B69 to close the switch as the elevator car stops at the lower terminal or first floor landing to indicate that the car is located at such landing. Similarly, the cam 24 engages the cam follower for the switch T69 as the elevator car stops at the upper terminal or fifth floor landing to indicate that the elevator car is located at such landing. As will be explained hereinafter, the switches B69 and T69 supply synchronizing signals for the elevator control system floor selector circuits.

The elevator car A carries an inductor notching relay Z which is utilized to produce notching signals as the elevator car travels in its hoistway. This relay may be of a conventional type and is mounted on the car in a position to pass adjacent each of a plurality of inductor plates ZP1, ZP2, ZP3 and ZP4 of magnetic material mounted in the hoistway. The inductor plates are so positioned that the inductor notching relay Z comes into horizontal alignment with one of the plates when the elevator car is half-way between floors.

The relay Z has two break contacts Z1 and Z2. These contacts remain closed after the coil of the inductor relay is energized until the relay during movement of the elevator car comes into horizontal alignment with one of its associated inductor plates. The contacts Z1 and Z2 are provided with contact operating armatures 25 and 26, respectively.

If the coil of the inductor notching relay Z is energized, such energization alone is insufficient to open either of the contacts Z1 or Z2. If the inductor relay while its coil is energized reaches one of the inductor plates ZP1 or ZP3, a magnetic circuit is completed which results in opening of the break contacts Z1. The contacts Z1 momentarily open while the relay Z is opposite one of the inductor plates ZP1 or ZP3 but immediately reclose when the inductor relay passes beyond such plate. Similarly, if the inductor relay Z while its coil is energized reaches one of the inductor plates ZP2 or ZP4, a magnetic circuit is completed which results in opening of the break contacts Z2. Thus, when the relay is moved past one of the plates ZP2 or ZP4, the contacts Z2 momentarily open while the relay is opposite such plate but immediately reclose when the inductor relay passes beyond such plate. It will be appreciated, therefore, that as the elevator car moves between terminal floors the break contacts Z1 and Z2 alternately open as the car proceeds from a position half-way between a pair of adjacent floors to a position half-way between the next pair of adjacent floors in the direction of car travel. The armatures 25 and 26 of the break contacts Z1 and Z2 are connected to a bus L—, which represents the negative side of a suitable direct current source.

The elevator car A also contains a car station provided with a plurality of car call push buttons 1C through 5C, which may be operated to register calls for floors desired by passengers within the elevator car. For example, the push button 1C may be operated to register a call for the first floor. In a similar way, the push buttons 2C through 5C may be operated to register calls for the second through fifth floors, respectively.

In order to permit prospective passengers located at the various floors served by the elevator car to register calls for elevator service, a suitable push button station is located at each of the floors. Each of the push buttons for registering a call for up service is identified by the reference character U prefixed by a numeral denoting the floor with which the push button is associated. In an analogous manner, each of the push buttons associated with a floor from which a down call may be registered is identified by the reference character D prefixed by a numeral denoting the specific floor with which the push button is associated. Thus, the floor push button station for the second floor includes an up floor or corridor call push button 2U and a down floor or corridor call push button 2D.

The elevator car motor 11 is a three-phase induction motor which may be connected to a suitable three-phase source of energy (not shown) through make contacts of the up switch 1 or the down switch 2. Thus, when the up switch 1 is energized and picked up, its make contacts 1-1, 1-2 and 1-3 close to cause the shaft 12 of the motor 11 to rotate the sheave 13 in a counterclockwise direction, as viewed in FIG. 1. As a result thereof, the elevator car moves upwardly in its hoistway. When the down switch 2 is energized and picked up its make contacts 2-1, 2-2 and 2-3 close to cause the sheave 13 to rotate in a clockwise direction, as a result of which the car travels downwardly in its hoistway. It will be apparent that pickup of either the up switch 1 or the down switch 2 results in energization of the car brake 15 to release the brake. When the switches 1 and 2 both are in a deenergized state, the brake coil also is denergized, and thus the brake is applied to the drum 14.

Energy for the elevator car control circuits is derived from a suitable direct current source, heretofore mentioned, represented by the buses L— and L+, the latter of which is connected to ground GR.

Before the elevator car A can move, make contacts 40-1 of the door safety relay 40 must be closed to indicate that all of the doors associated with the elevator car A are in safe condition. Under these circumstances, one of the switches 1 or 2 may be energized. If the car is at the lower terminal floor conditioned for up travel, the car may be started through the circuit,

L—, 34-1, 1, 2-4, 27, 81U1, 80-1, 40-1, L+

Closure of the break contacts 34-1 indicates that the elevator car is in condition to be started. Under the assumed conditions, a mechanical limit switch 27 is closed. The limit switch 27 is normally biased in closed position and is cam operated to open as the elevator car nears its upper limit of travel. If the car is set for up travel, the make contacts 81U1 are closed; and if a call is registered which may be answered by the elevator car, the make contacts 80-1 also are closed. When the up switch 1 picks up, its break contacts 1-4 open to prevent subsequent energization therethrough of the down switch 2. Energization of the up switch also results in the closure of its make contact 1-5 to establish a holding circuit around the contacts 80U1 and 80-1.

If the elevator car is at the upper terminal floor, the down switch 2 may be energized through the circuit

L—, 34-1, 2, 1-4, 28, 81D1, 80-1, 40-1, L+

Under the assumed conditions, the contacts of a mechanical limit switch 28 and the make contacts 40-1 are closed. The limit switch 28 normally is biased in closed position and is cam operated to open as the elevator car nears its lower limit of travel. If the elevator car is set for down travel the make contacts 81D1 of the down direction preference relay 81D are closed.

Pickup of the down switch 2 results in opening of its break contacts 2-4 to prevent subsequent energization therethrough of the up switch 1. Closure of the make contacts 2-5 establishes a holding circuit around the contacts 81D1 and 80-1.

In order for the master call relay 80 to be energized and picked up, the break contacts 70-1 must be closed. These contacts are closed after the elevator car has remained at a floor for a time sufficient for the discharge and/or entry of car passengers. If the contacts 70-1 are closed, the relay 80 may be energized through either of the break contacts 81U2 or 81D2. Pickup of the relay 80 results in closure of its make contacts 80-2 partially to establish a holding circuit around the contacts 81U2 or 81D2 and 70-1. Subsequent closure of the make contact 1-6 or 2-6 results in the completion of such holding circuit.

The remaining circuits illustrated in FIG. 1 all are associated with the doors provided for the elevator car, with the exception of the circuit for the coil of the inductor notching relay Z. The car is provided with a door AD of a conventional type mounted for horizontal sliding movement by means of a pair of hangers ADH and a pair of rollers ADR on a track ADT, which is suitably secured to the car A. It will be understood that a hoistway door of a conventional type may be employed if desired at each floor served by the elevator car.

All of the components contained within a broken-line rectangle RE in FIG. 1 are mounted on the elevator car A. Thus, a car-mounted mechanical switch 29 is employed for controlling energization of the door safety relay 40. The switch 29 is a limit switch which is formally biased in open condition and is cam operated to close when the elevator car door is in its fully closed position. Likewise, a cam-operated normally-open limit switch 30 is provided for each hoistway door. Each switch 30 is closed when its associated hoistway door is in its fully closed position. Consequently, the door safety relay 40 cannot be energized and picked up unless all of the door limit switches associated therewith are in closed condition.

To operate the elevator car door AD, a car door motor 31 is provided. The motor 31 is provided with a shaft 31S, which is suitably coupled to the elevator car door. The motor has an armature 31A, which may be reversibly energized through make contacts of the door open relay OP and the door close relay CL. Thus, when the door open relay is energized and picked up, its make contacts OP1 and OP2 are closed to energize the armature 31A such that the shaft 31S rotates in the proper direction for opening the car door. When the door close relay is energized and picked up, its make contacts CL1 and CL2 close to energize the armature 31A in the proper direction for closing the elevator car door. The field 31F of the car door motor is connected permanently across the buses L— and L+. The door motor 31 also may be utilized to open and to close the hoistway doors provided for the elevator car through any conventional car and hoistway door coupling means, such as a vane and drive block arrangement which is well known in the art.

Energization of the door open relay OP is controlled by break contacts 45-1 of the door master relay 45 and by a mechanical limit switch 32. The limit switch 32 normally is biased in its closed position and is cam operated to open as the elevator car door reaches its fully open position. Thus, if the door master relay 45 is deenergized and dropped out and if the elevator car door is away from its fully open position, the door open relay OP is energized through the contacts 45-1 and the limit switch 32.

In a similar manner, pickup of the door close relay CL is controlled by make contacts 45-2 of the door master relay and by a mechanical limit switch 33. The limit switch 33 normally is biased in its closed position and is cam operated to open as the elevator car door reaches its fully closed position. It follows that when the door master relay 45 is energized and picked up and when the car door is away from its fully closed position, the door close relay CL is energized through the make contacts 45-2 and the limit switch 33.

The coil of the inductor notching relay Z is connected permanently to the buses L— and L+. It will be recalled that the operation of the break contacts Z1 and Z2 of the inductor notching relay is controlled by the position of this relay with respect to the inductor plates ZP1 through ZP4, which are disposed in the elevator car hoistway.

Before turning to the static element control circuits embodying the invention, it is deemed advisable to provide a short description of each of the individual components thereof. For this purpose, reference will be made to FIGS. 2A through 5.

Figure 2A:
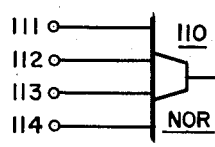
FIG. 2A is a symbolic representation of a NOR element.
Figure 2B:
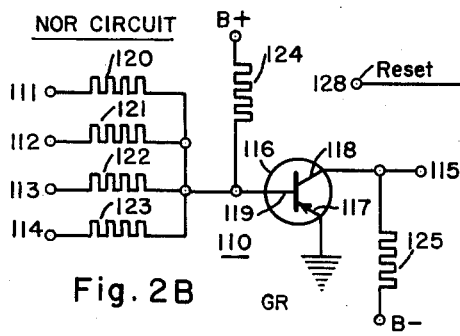
FIG. 2B is a schematic diagram of a preferred NOR element circuit.

FIGURES 2A and 2B

FIGURE 2A is a symbolic representation of a NOR element 110, which performs a NOR logic function and which may be utilized in the layout of a system employing NOR logic elements for the purposes of simplicity and clarity. This symbol has been utilized extensively in the literature of the art to represent the NOR logic function.

The NOR element 110 has four input terminals 111, 112, 113 and 114 and an output terminal 115. This element produces an output signal at the terminal 115 only when no input signal is present at the input terminals 111 through 114. If an input signal is present at any one or more of the last-named terminals, however, there is no output signal at the terminal 115. If the logic function is performed in a binary system, for convenience the presence of a signal may be considered to be a "one" and the absence of a signal may be considered to be a "zero." Thus, in binary terms, the output of the NOR element 110 at its output terminal 115 equals one when all of its inputs at the terminals 111 through 114 are zero; and the output of this element at the terminal 115 equals zero when any one or more inputs thereto equals one.

Turning now to FIG. 2B, the schematic diagram of one form of NOR element is shown therein. In this diagram, a PNP transistor 116 is utilized to perform a NOR logic function.

The transistor 116 comprises a semiconductive body having an emitter electrode 117, a collector electrode 118 and a base electrode 119. The emitter electrode 117 is connected to ground GR. The base electrode 119 is connected to the input terminals 111 through 114 through their respective isolating resistors 120, 121, 122 and 123. The base electrode 119 also is connected through a resistor 124 to a suitable B+ bias voltage source. The collector electrode 118 is connected through a current-limiting resistor 125 to a suitable B— voltage supply source. The collector electrode also is connected to the output terminal 115. Conveniently, the B— end of the resistor 125 may be connected to the bus L—, while the B+ end of the resistor 124 may be connected to a positiev direct voltage supply of the same magnitude with respect to ground as the B— supply.

In operation, the B+ bias supply biases the transistor 116 to cutoff through the resistor 124. Thus, when there is no input signal at the terminals 111, 112, 113 and 114, the transistor 116 is cut off and an output appears at the terminal 115 which will be approximately the value of the B— supply. If a negative signal with respect to ground sufficient in magnitude to drive the transistor 116 to a fully saturated condition is applied to one or more of the input terminals, the transistor 116 will conduct and there will be no output at the terminal 115. It will be appreciated, therefore, that the apparatus illustrated in FIG. 2B performs the NOR logic function as hereinbefore described, that is, when a negative signal is present at any one or more of the input terminals 111, 112, 113 and 114, the output at the terminal 115 is zero. If no input signal is present at the terminals 111 through 114, however, the output at the terminal 115 is one.

Although the apparatus of FIG. 2B uses a PNP type of transistor, a NPN type of transistor may be utilized if the polarities of the B+ bias voltage, B— supply voltage and the input signals are reversed. Furthermore, although the NOR element of FIGS. 2A and 2B has four input terminals, it will be understood that a NOR element may have any number of input terminals, one or more, and respective associated input isolating resistors. In the event that a NOR element has only one active input terminal, such element opeartes merely as a signal inversion device; i.e., in binary terms, when its input equals zero, its output is one; and its output is zero when its input is one.

Figures 3A, 4A:
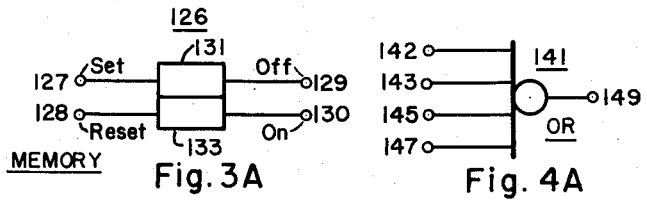
FIG. 3A is a symbolic representation of a MEMORY element.
FIG. 4A is a symbolic representation of an OR element.
Figures 3B, 4B:
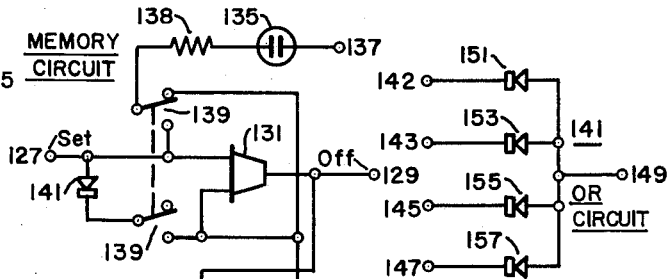
FIG. 3B is a schematic diagram of a preferred MEMORY element circuit.
FIG. 4B is a schematic diagram of a preferred OR element circuit.

FIGURES 3A and 3B

In FIG. 3A a suitable symbol representing a MEMORY element 126 is shown. As hereinbefore noted, the MEMORY element, in response to a first condition, produces an output which is maintained even though the first condition thereafter is discontinued. The MEMORY element is reset and the output terminated in response to a second condition.

The MEMORY element 126 has two input terminals 127 and 128, which may be designated set and reset, respectively, and two output terminals 129 and 130, which may be designated off and on, respectively. In response to the presence of an input signal at the set input terminal 127 and the absence of an input signal at the reset input terminal 128, an output signal appears at the on output terminal 130 and no output signal is present at the off output terminal 129. The output signal at the on output terminal 130 will be maintained, although the input signal at the set input terminal 127 is removed, so long as no signal is applied to the reset input terminal 128. If, however, a reset signal thereafter is applied to the reset input terminal 128, the output signal at the on output terminal 130 terminates, and an output signal appears at the off output terminal 129. The last-named output signal will be maintained, although the reset signal is removed from the reset input terminal 128, so long as no signal is applied to the set input terminal 127. Finally, if input signals are applied to both of the input terminals 127 and 128 simultaneously, no output signal is present at either of the output terminals 129 and 130.

The foregoing operation of the MEMORY element 126 may be stated in terms of binary notation as follows: The output signal at the on output terminal 130 equals one and the output signal at the off output terminal 129 equals zero if the input signal at the set input terminal 127 equals one and the input signal at the reset input terminal 128 equals zero or if both of the latter are zero and the signal at the set input terminal 127 was the last input signal to be one. Furthermore, the output signal at the on output terminal 130 will be zero and the output signal at the off output terminal 129 will be one if the input signal at the set input terminal 127 is zero and the input signal at the reset input terminal 128 is one or if both the set and reset input signals simultaneously are zero and the signal at the reset input terminal 128 was the last input signal to be one. Finally, both the off and on output signals at the terminals 129 and 130, respectively, will be zero if both the set and reset input signals at the terminals 127 and 128, respectively, are one.

It will be noted that the above-described MEMORY element functions actually include the signal inversion operations of two single-input NOR elements; i.e., when the set input signal is zero the off output signal is one, when the set input signal is one, the off output signal is zero, and similarly for the relationship between the reset input and on output signals. It will be observed that in the elevator control system presently to be described use is made of both the off and on output signals of certain MEMORY elements, while in other instances only the on output signal is used, no external circuit connection being made to the off output terminal. In still other instances, only the off output signal of the MEMORY element is employed, and no external circuit connection is made to the on output terminal of the MEMORY element.

As is illustrated in FIG. 3B, a MEMORY element conveniently may be constructed by the cross connection of the output and input terminals of two NOR elements 131 and 133. It will be observed that each of these NOR elements has two input terminals. One of the input terminals of the NOR element 131 is connected to the set input terminal 127, while one of the input terminals of the NOR element 133 is coupled to the reset input terminal 128. The other input terminal of the NOR element 131 is connected to the output terminal of the NOR element 133, while the other input terminal of the NOR element 133 is coupled to the output terminal of the NOR element 131. Additionally, the output terminal of the element 131 is connected to the off output terminal 129, and the output terminal of the NOR element 133 is connected to the on output terminal 130.

It will be apparent that the MEMORY element of FIG. 3B as thus far described is capable of producing the MEMORY logic functions set forth heretofore. In certain applications, however, it may be desirable for the MEMORY element to produce additional indications. For example, a visual indication of an operation in the system in which the MEMORY element is installed may be desired. For this purpose a lamp, preferably a gas-filled lamp 135 of the neon type, may be provided. One element of the lamp 135 is connected to a terminal 137, while the other element thereof is connected through a current-limiting resistor 138 to the on output terminal 130 of the MEMORY element through one side of a double-pole double-throw switch 139 when the switch is thrown to the position illustrated in FIG. 3B.

As heretofore explained, in the present elevator control system corridor and car calls for elevator service are registered by means of push buttons, one terminal of each of which is connected to the bus L—. Another terminal of each of these push buttons is connected to the set input terminal of an associated MEMORY element. Thus, if a visual indication of the pressing of such a push button is desired, the terminal 137 may be connected to the positive side of a suitable pulsating direct voltage source (not shown), the negative side of which is grounded; and upon the pressing of the aforementioned push button the lamp 135 will be illuminated. After the push button is released, the lamp is maintained illuminated as long as an output signal appears at the on output terminal 130 of the MEMORY element 126, that is, until a reset input signal is applied to the reset input terminal 128.

Under certain conditions, as where the push button and the lamp 135 are located at an appreciable distance from their associated MEMORY element, it may be desired to eliminate external wiring to the on output terminal 130. In such instance, a diode rectifier 141 may be employed in conjunction with the lamp 135. The rectifier 141, which may be of the semiconductor type, has a negative terminal which is connected to the set input terminal 127 of the MEMORY element and a positive terminal, which is coupled to the second pole of the switch 139. Thus, when the switch 139 is thrown to its lower position, as viewed in FIG. 3B, and when the call push button is released, the on output signal of the MEMORY element is applied to illuminate the lamp 135 through the diode rectifier 141 and the switch 139. It will be appreciated that such illumination is maintained until the MEMORY element is reset by the application of a signal to the reset input terminal 128.

While it is possible to employ other types of NOR and MEMORY elements in the present control system, the circuits of FIGS. 2B and 3B, respectively, are preferred embodiments of such elements. It will be appreciated that the use of these circuits results in an elevator control system having a minimum number of different types of static components and requiring a minimum amount of space. These factors, in turn, result in a more reliable control system of relatively low first cost and requiring a minimum of maintenance.

FIGURES 4A and 4B

FIG. 4A is a symbolic representation of an OR element 141. As heretofore explained, an OR element may have an output if any of a plurality of input conditions is present. The OR element 141 has four input terminals 142, 143, 145 and 147 and an output terminal 149. If a signal is applied to any one or more of the input terminals, an output signal will appear at the output terminal 149. Stated in terms of binary notation, the output signal of the OR element at the terminal 149 is one if the input signal at any one or more of the input terminals is one. Furthermore, the output signal of the OR element is zero if all of its input signals simultaneously are zero.

FIG. 4B is a schematic diagram of the OR element 141. This element comprises four diode rectifiers 151, 153, 155 and 157, preferably of the semiconductor type. The positive terminal of each of these rectifiers is connected to a separate input terminal of the OR element, while the negative terminals of all of these rectifiers are connected to the output terminal 149. It will be appreciated that the circuit of FIG. 4B will perform the OR logic function described heretofore.

It should be observed that an OR element may have as few as two inputs or as many inputs greater than two as are required, as long as a separate diode rectifier is provided for each input, and that the circuit of FIG. 4B is illustrative only.

In the elevator control system hereinafter described, it is necessary in some instances to employ a single diode rectifier for purposes of isolation. Although by definition such a component is not an OR element, in the interests of convenience and simplicity it will be referred to and represented symbolically as a single-input OR element.

FIGURE 5

FIG. 5 is a symbolic representation of a DELAY element 159, which interposes a delay between the application thereto of an input signal at an input terminal 161 and the production thereby of an output signal at an output terminal 163. Thereafter the output signal continues until the input signal is terminated. Since such DELAY elements are well known in the art, it appears unnecessary to describe them further.

Figure 6E:
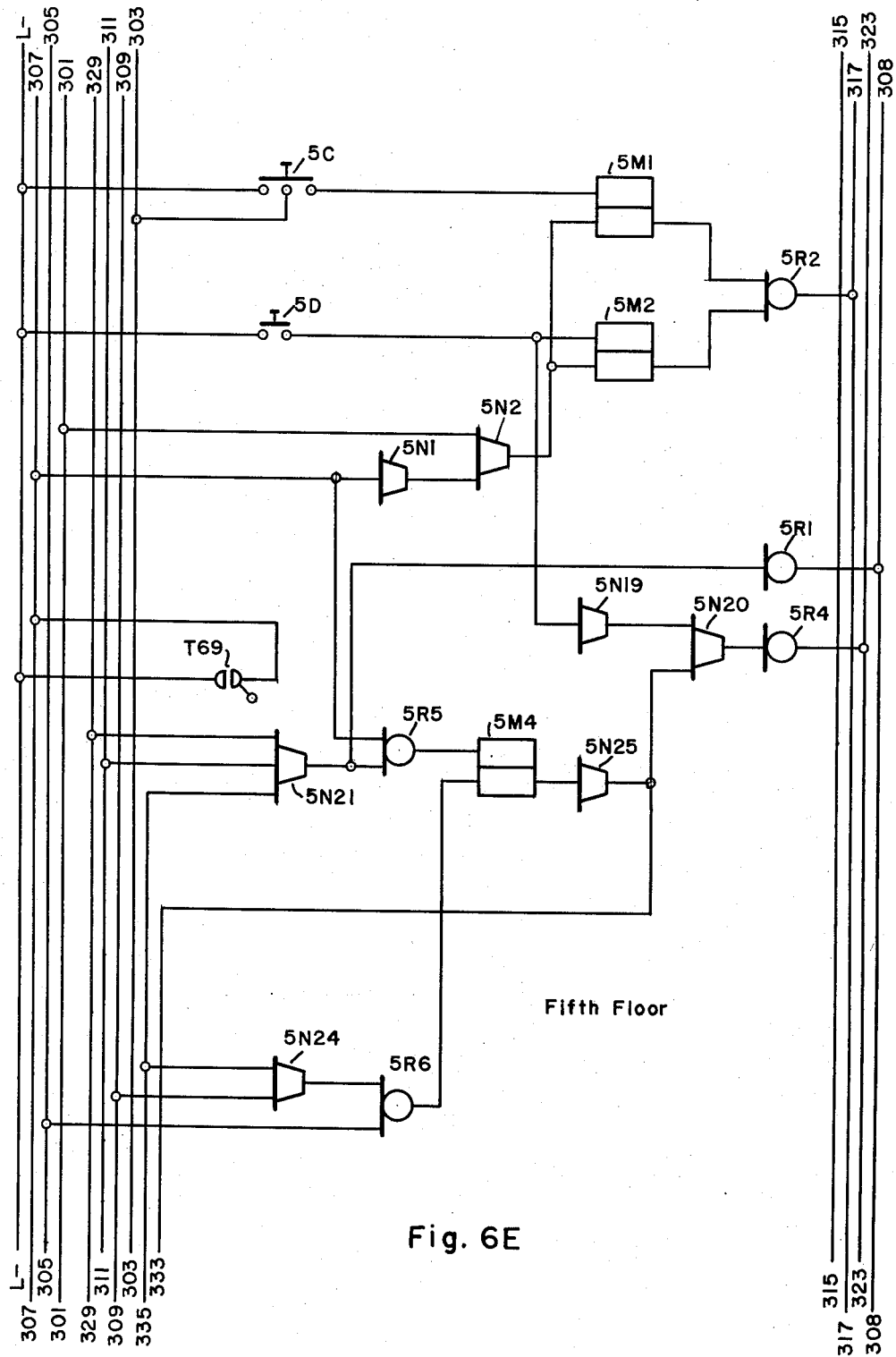

FIGURES 6 through 6E

FIGS. 6A through 6E illustrate the logic circuits associated with the first through the fifth floors, respectively, of the elevator system. These drawings employ the symbols heretofore described for the various static elements used in the elevator control system.

Adjacent each symbol is a reference character having a prefix numeral which indicates the floor with which the element is associated. In addition, each reference character includes a letter which indicates the specific type of static element designated thereby. Thus, the letter N designates a NOR element, the letter M indicates a MEMORY element and the letter R is indicative of an OR element. For example, the reference character 3N19 designates a NOR element associated with the logic circuits for the third floor; reference character 1M4 designates a MEMORY element associated with the logic circuits for the first floor; and the reference character 5R2 indicates an OR element associated with the logic circuits for the fifth floor. Furthermore, within each drawing the static elements thereof are grouped according to circuit function. Thus, eliminating the prefix numerals which designate the particular floors, NOR elements N1 through N5 and MEMORY elements M1 through M3 are associated with the call registration and cancelling circuits. NOR elements N6 through N9 and OR element R1 are associated with the elevator car stopping circuits. NOR elements N10 through N18 and OR elements R2 and R3 are associated with the car direction circuits. NOR elements N19 and N20 and OR element R4 are associated with the car door-opening circuits. Finally, NOR elements N21 through N25, MEMORY element M4 and OR elements R5 and R6 are associated with the landing selector circuits.

For convenience, the logic circuits first will be described, in the order given, according to each of the above-named functions for all of the floors. In this connection, it will be observed that the arrangements of the static elements for the lower terminal or first and upper terminal or fifth floors (FIGS. 6A and 6E, respectively) are identical to one another, while such arrangements for the second, third and fourth or intermediate floors (FIGS. 6B, 6C, and 6D, respectively) are identical to each other. Additionally, the circuits for each of the five floors according to the above-named functions respectively are basically the same, those for the first and fifth floors in general being simpler than those for the intermediate floors because of the physical locations of the former floors.

Since the static element circuits for the third floor, FIG. 6C, are typical, the third floor circuits will be described in detail. It will be appreciated that such description also applies generally to the remaining floors of the elevator system. Initially it will be assumed that the elevator car is located at the bottom terminal or first floor landing, that the lines L— and L+ are energized and that no call for elevator service is registered in the system.

In the upper left-hand portion of FIG. 6C are illustrated car and corridor call registration and cancelling circuits for the third floor. Considering the circuit associated with the third floor call car push button 3C, the set input signal to the MEMORY element 3M1 is zero, since the push button has not been pressed. It will be observed that the reset input signal for the MEMORY element 3M1 is supplied from the NOR element 3N2, one input terminal of which is connected to a bus 301. Since the elevator car is not running, however, the bus 301 at this time is deenergized; but inasmuch as the elevator car is not located at the third floor, a signal is applied to the other input terminal of the NOR element 3N2, as hereinafter will be explained. Consequently, there is no output from the NOR element 3N2 and, therefore, no resetting input signal to the MEMORY element 3M1. Since no input signal is applied to the MEMORY element 3M1, it delivers no output to the input terminal of the NOR element 3N3, and the latter thus produces a voltage at its output terminal.

Assuming now that the car call push button 3C is pressed, voltage from the bus L— is applied to the set input terminal of the MEMORY element 3M1. Consequently, this MEMORY element changes its state to deliver an input voltage to the NOR element 3N3, and the output of the latter in turn drops to zero to indicate the registration of the car call. Since the MEMORY element 3M1 continues to energize the input terminal of the NOR element 3N3 even after the push button 3C is released, the MEMORY element in effect "stores" the car call for the third floor until a reset input signal is applied thereto.

It also will be observed that when the push button 3C was pressed a bus 303 was energized from the bus L—. The affect of such energization will be considered hereinafter.

If it is next assumed that the elevator car travels to and stops at the third floor, both inputs to the NOR element 3N2 become zero. Consequently, this element applies a signal to the reset input terminal of the MEMORY element 3M1 to reset the MEMORY element and thus to terminate the input signal to the NOR element 3N3, which in turn produces an output voltage at its output terminal. The production of such output voltage, therefore, indicates that the previously registered car call for the third floor has been cancelled.

By inspection of the drawings, it will be observed that the remaining car call and the up and down floor call registration and cancelling circuits for the elevator system operate in a manner similar to those described for the third floor car call push button 3C, with the exception that the pressing of the up or down floor call push buttons does not result in the energization of the bus 303 and with the further exception that the MEMORY elements associated with the push buttons for the first and fifth floors are reset in a somewhat different manner.

Referring to FIG. 6A for the first floor, it will be observed that the NOR element 1N2 receives one of its input signals from the bus 301, as does the NOR element 3N2 previously described. The other input signal to the NOR element 1N2, however, is derived from the output of a NOR element 1N1, which in turn receives its input signal from a bus 305. By inspection of FIG. 6A it will be seen that the bus 305 is energized from the bus L— through the cam-operated mechanical switch B69 which is closed when the elevator car is located at the first floor, as heretofore explained (refer to FIG. 1). Thus, when the switch B69 is in closed condition, the NOR element 1N1 supplies no input signal to the NOR element 1N2, and if the elevator car is not running the other input terminal of the NOR element 1N2 also is deenergized. Under these conditions, the last-named element produces an output voltage to reset the MEMORY elements 1M1 and 1M3. Similarly, the cam-operated switch T69 operates to reset the call storage MEMORY elements 5M1 and 5M2 (FIG. 6E) from a bus 307 when the elevator car is stopped at the fifth floor.

Returning to FIG. 6C, in the upper right-hand portion thereof are the stopping circuits for the elevator car for the third floor. Let it be assumed that a car call has been registered for the third floor by the pressing of the push button 3C. As heretofore explained, such pressing results in the production of zero output by the NOR element 3N3. If the elevator car is approaching the third floor, a signal momentarily is applied to the input terminal of the NOR element 3N6. Thus, both of the inputs to the NOR element 3N7 momentarily become zero, and consequently voltage is applied to a bus 308 through the OR element 3R1 from the output terminal of the NOR element 3N7. This voltage is a stopping signal for the elevator car for the third floor, as will be explained hereinafter.

Let it now be assumed that a down corridor call is registered for the third floor by the pressing of the push button 3D. If the elevator car is approaching the third floor in the down direction, the output of the NOR element 3N6 once again momentarily becomes zero and a bus 309 is deenergized. Inasmuch as all of the inputs to the NOR element 3N8 momentarily are zero, this element now energizes the bus 308 through the OR element 3R1 to stop the elevator car at the third floor.

Next assume that an up corridor call is registered for the third floor by the pressing of the push button 3U and that the elevator car is approaching the third floor in the up direction of travel. Under these conditions the NOR element 3N5 provides zero input to the NOR element 3N9. As the car approaches the third floor the output of the NOR element 3N6 again momentarily becomes zero, and since the car is traveling up, zero input is furnished to the NOR element 3N9 from a bus 311. As a result, all of the inputs to the NOR element 3N9 momentarily are zero, and this element thus energizes the bus 308 through the OR element 3R1 to stop the elevator car at the third floor.

It will be observed in FIGS. 6A and 6E that the stopping signals for the first and fifth floors, as applied through the OR elements 1R1 and 5R1 to the bus 308, are derived from the NOR elements 1N22 and 5N21, respectively. The operation of these elements is described hereinafter.

The upper middle left-hand and the middle right-hand portions of FIG. 6C illustrate the circuits required to provide direction signals for the elevator car for the third floor. The aforesaid middle right-hand portion conveniently may be divided into two groups—those circuits associated with the OR element 3R2, which provide up direction signals for the elevator car, and those circuits associated with the OR element 3R3, which provide down direction signals for the elevator car.

It will be observed that one input to each of the NOR elements 3N13 through 3N18 is derived from one of the call-for-elevator-service NOR elements 3N3, 3N4 or 3N5, whose operation previously has been described. The second input to each of the NOR elements 3N13 through 3N18 is dependent upon the position of the elevator car with respect to the third floor.

The second input terminal of the NOR element 3N14 is connected to a bus 313, which is deenergized when the elevator car is located below the third floor, and energized when the car is located at or above the third floor. It will be observed that the bus 313 also is connected to the single input terminal of the NOR element 3N10, the output of which is applied to the second input terminals of the NOR elements 3N16 and 3N17. Thus, when the car is located below the third floor the second input terminals of the NOR elements 3N16 and 3N17 are energized; and when the car is located at or above the third floor such terminals are deenergized.

The output of the NOR element 3N10 also is coupled to one of the input terminals of the NOR element 3N11. The NOR element 3N11 has a second input terminal which is deenergized when the elevator car is not located at the third floor and energized when the car is located at the third floor. Accordingly, when the elevator car is located at or below the third floor the output of the NOR element 3N11 is zero; and when the car is located above the third floor the NOR element 3N11 produces an output voltage which is applied to the second input terminals of the NOR elements 3N13 and 3N15.

The output of the NOR element 3N11 also is applied to the input terminal of the NOR element 3N12, whose output signal is merely an inversion of its input signal. Consequently, when the elevator car is located at or below the third floor, a signal is applied to the second input terminal of the NOR element 3N18; and when the car is located above the third floor such terminal is deenergized.

The following brief examples will serve to illustrate operation of the circuits just described. It will be assumed initially that the elevator car is located at the first floor and that a car call has been registered for the third floor by the pressing of the push button 3C. Such registration results in deenergization of the input terminals of the NOR elements 3N13 and 3N16 from the NOR element 3N3, as previously described. Under the assumed conditions, the NOR element 3N10 delivers an input signal to the NOR element 3N16, as mentioned heretofore. Thus, it will be seen that the outputs of the NOR elements 3N16, 3N17 and 3N18 all are zero and that a bus 315, therefore, is deenergized. The output of the NOR element 3N11, however, is zero at this time. Consequently, no input voltage is applied to the NOR element 3N13, and this element produces an output voltage to energize a bus 317 through the OR element 3R2, i.e., to provide an up direction signal for the elevator car.

Next let it be assumed that the elevator car is located at the fifth floor and that the push button 3C is pressed to register a car call for the third floor. Once again the output of the NOR element 3N3 drops to zero to deenergize the input terminals of the NOR elements 3N13 and 3N16 supplied thereby. Under the assumed conditions the NOR element 3N11 produces an output voltage to energize one of the input terminals of the NOR element 3N13, and the output terminal of the latter element accordingly remains deenergized. Furthermore, the NOR elements 3N14 and 3N15 produce no output, and the bus 317 thus is deenergized. However, the output of the NOR element 3N10 now is zero, since the elevator car is located above the third floor. Consequently, no input signal is applied to the NOR element 3N16, and this element therefore, produces an output voltage to energize the bus 315 through the OR element 3R3, i.e., to provide a down direction signal for the elevator car. It will be seen subsequently that energization of the bus 315 or the bus 317 determines whether the elevator car will start in the down or the up direction, respectively.

By inspection of the drawings, it will be observed that the output of the NOR element 3N11 also is applied through a bus 319 to two NOR elements for the floor above, in this case the NOR elements 4N10 and 4N14 (FIG. 6D) for the fourth floor. Similarly, the bus 313 is connected to the output terminal of the NOR element 2N11 (FIG. 6B) for the second floor. Input voltages for the NOR elements 2N10 and 2N14 are supplied from a bus 321, which in turn is connected to the output terminal of the NOR element 1N25 (FIG. 6A) for the first floor. It will be appreciated that because the fifth floor is the upper terminal floor the output of the NOR element 4N11 (FIG. 6D) is not coupled to the fifth floor circuits (FIG. 6E).

Although the direction signal circuits for all of the intermediate floors are similar to each other, those for the first and fifth floors materially differ therefrom. Since the elevator car can travel toward the first floor only in the down direction, only a down direction signal need be furnished for the car in order that it may answer calls for service for the first floor. Such signal is applied to the bus 315 through the OR element 1R3, whose input terminals are connected to the on output terminals of the MEMORY elements 1M1 and 1M3. Thus, the registration of a car call or an up corridor call for the first floor by the pressing of the push button 1C or 1U, respectively, results in the application of a down direction signal to the bus 315.

In a similar manner and for similar reasons, only an up direction signal need be supplied for the elevator car in response to the registration of calls for service for the fifth or upper terminal floor. Referring to FIG. 6E, it will be observed that when a car call or a down corridor call is registered for the fifth floor, an up direction signal is applied to the bus 317 through the OR element 5R2 from the MEMORY element 5M1 or the MEMORY element 5M2, respectively. In such instance, the elevator car will start in the up direction from a floor below the fifth floor.

Returning now to FIG. 6C, in the lower middle left-hand portion thereof are shown circuits which control the opening of the elevator car door when the car is located at the third floor and a corridor call is registered therefor. The registration of an up or a down corridor call for the third floor by the pressing of the push button 3U or 3D, respectively, results in the application of an input voltage to the NOR element 3N19, and this element consequently furnishes no input to the NOR element 3N20. Assuming that the elevator car is stopped at the third floor, the other input to the NOR element 3N20 also is zero. As a result thereof, the NOR element 3N20 energizes a bus 323 through the OR element 3R4. If it is assumed that the door of the elevator car was closed at the time of the registration of the corridor call for the third floor, energization of the bus 323 results in the opening of the door, as hereinafter will be explained. By inspection of the drawings, it will be observed that the door-opening circuits for the remaining floors served by the elevator car are similar to those just described for the third floor.

The lower portions of FIGS. 6A through 6E illustrate landing selector circuits for the first through fifth floors, respectively. Referring to FIG. 6A and assuming that the elevator car is located at the first floor, the cam-operated switch B69 is in closed condition to energize the bus 305 from the bus L—, as heretofore explained. Accordingly, a signal is applied to the set input terminal of the MEMORY element 1M4 from the bus 305, through the OR element 1R5. (It will be observed that closure of the switch B69 to energize the bus 305 also results in the application of a reset signal to the reset input terminals of each MEMORY element M4 for each floor above the first floor through its respective associated OR element R6.) The MEMORY element 1M4, therefore, produces an output voltage, which is applied to the NOR element 1N25, whose output voltage as a result thereof drops to zero, thereby indicating that the elevator car is located at the first floor. As was noted heretofore, the output terminal of the NOR element 1N25 is connected to the bus 321.

Let it be assumed that the elevator car is started in the up direction. Such starting results in deenergization of the bus 311 as will be explained hereinafter. It will be understood that as the car leaves the first floor the bus 305 is deenergized when the switch B69 opens as it disengages the cam 24 (FIG. 1). As the elevator car moves upwardly and the inductor notching relay Z passes the inductor plate ZP1, the contacts Z1 momentarily open to deenergize a bus 325 connected thereto.

Turning now to FIG. 6B, since all of the inputs to the NOR element 2N21 momentarily are zero, this element produces an output voltage which is applied to the set input terminal of the MEMORY element 2M4 through the OR element 2R5. Recalling that the bus 305 has been deenergized and that as a result thereof no signal is applied to the reset input terminal of the MEMORY element 2M4, the MEMORY element produces an output voltage to energize the input terminal of the NOR element 2N25. Thus, the output of the NOR element 2N25, which is applied to a bus 327, drops to zero.

Returning to FIG. 6A and recalling that the elevator car is traveling in the up direction, it will be observed that both of the inputs to the NOR element 1N23 now are zero. As a result thereof, this element applies voltage through the OR element 1R6 to the reset input terminal of the MEMORY element 1M4. Since the NOR element 1N25 now has no input signal, this element energizes the bus 321 without immediately affecting system operation.

Briefly summarizing the foregoing description of operation, as the elevator car travels upwardly from the first to the second floor the selector circuits "notch" to the second floor to "turn on" the MEMORY element 2M4 (FIG. 6B) for the second floor and to "turn off" the MEMORY element 1M4 (FIG. 6A) for the first floor.

It will be observed that the momentary output voltage of the NOR element 2N21 (FIG. 6B) also is applied to the input terminal of the NOR element 2N6 through the OR element 2R5 as the elevator car approaches the second floor. The output of the NOR element 2N6, therefore, momentarily drops to zero. Thus, if a car call or an up corridor call for elevator service is registered for the second floor, the NOR element 2N7 or the NOR element 2N9, respectively, momentarily energizes the bus 308 through the OR element 2R1 to provide a stopping signal for the car for the second floor as heretofore explained. In addition, as the car stops at the second floor in response to such a call, the bus 301 is deenergized. Since the NOR element 2N2 has no input signal at such time, it produces an output voltage to reset the MEMORY element which stored the call in response to which the car stopped.

Assuming, however, that the elevator car continues to travel upwardly toward the third floor and referring to FIG. 1, when the car is located half-way between the second and third floors the inductor notching relay Z is positioned adjacent the inductor plate ZP2. This results in the momentary opening of the break contacts Z2, and the consequent deenergization of a bus 329, which is connected to such contacts. Since all inputs to the NOR element 3N21 (FIG. 6C) momentarily are zero, this element turns on the MEMORY element 3M4 through the OR element 3R5. The MEMORY element 3M4 accordingly delivers an input signal to the NOR element 3N25, whose output drops to zero to deenergize a bus 331.

When the bus 331 is deenergized, the NOR element 2N23 (FIG. 6B) has no input signal, and consequently the last-named element resets the MEMORY element 2M4 through the OR element 2R6. As a result thereof, the on output voltage of the MEMORY element 2M4 drops to zero, and the bus 327 thus is energized, due to the operation of the NOR element 2N25. Such energization, however, has no immediate effect on operation.

To summarize the foregoing, as the elevator car travels upwardly, the landing selector circuits notch to the floor being approached by the car to turn on the MEMORY element M4 associated therewith and to reset the MEMORY element M4 associated with the floor below. By inspection of the drawings, it will be observed that the selector circuits, when the elevator car is traveling in the up direction, for the fourth and fifth floors (FIGS. 6D and 6E, respectively) operate in a manner similar to those described for the first, second and third floors.

The landing selector circuits for down travel of the elevator car operate similarly to those described for up travel thereof. Let it be assumed that the elevator car is located at the fifth floor. Referring to FIG. 6E, it will be recalled that when the elevator car is so located the cam-operated switch T69 is in closed condition to energize the bus 307 therethrough from the bus L—. As a result thereof, voltage is applied from the bus 307 through the OR element 5R5 to the set input terminal of the MEMORY element 5M4. In addition, the bus 307 applies through the OR elements R6 a resetting input signal to each of the MEMORY elements M4 respectively associated with the floors below the fifth floor, as will be apparent by inspection of the drawings.

Since the set input terminal of the MEMORY element 5M4 is energized, this element applies an input voltage from its on output terminal to the NOR element 5N25. The output of the NOR element 5N25 consequently drops to zero to deenergize a bus 333.

Let it be assumed that the elevator car is started in the down direction. Under this condition, the bus 309 is deenergized, and the cam-operated switch T69 opens to deenergize the bus 307 as the car leaves the fifth floor. Referring to FIG. 6D, it will be observed that two of the inputs to the NOR element 4N22 now are zero. The third input to this element is connected to the bus 329. Turning for a moment to FIG. 1, when the elevator car is positioned half-way between the fifth and fourth floors, the inductor notching relay Z is located adjacent the inductor plate ZP4. Consequently, the break contacts Z2 momentarily open to deenergize the bus 329. Since all of the inputs to the NOR element 4N22 (FIG. 6D) now are zero, this element produces an output voltage which is coupled to the set input terminal of the MEMORY element 4M4 through the OR element 4R5. The MEMORY element 4M4, therefore, produces an on output voltage which causes the output of the NOR element 4N25 to drop to zero, deenergizing a bus 335.

Referring to FIG. 6E, it will be noted that both of the inputs to the NOR element 5N24 now are zero. As a result thereof, this element produces an output voltage to reset the MEMORY element 5M4 through the OR element 5R6. The input to the NOR element 5N25 thus drops to zero, and this element produces an output voltage to energize the bus 333. Such energization, however, has no immediate effect on system operation.

As the elevator car continues to move downwardly, the inductor notching relay Z (FIG. 1) passes the inductor plate ZP3 located half-way between the fourth and third floors. This results in the momentary opening of the break contacts Z1 to deenergize the bus 325. Accordingly, all of the inputs to the NOR element 3N22 (FIG. 6C) momentarily are zero, and this element produces an output voltage which is coupled to the set input terminal of the MEMORY element 3M4 through the OR element 3R5. Consequently, a voltage appears at the on output terminal of the MEMORY element 3M4, causing the output of the NOR element 3N25 to drop to zero to deenergize the bus 331. As a result of such deenergization, the NOR element 4N24 (FIG. 6D) has no input signal, and this element thus produces an output voltage to reset the MEMORY element 4M4 through the OR element 4R6.

By inspection of the drawings, it will be observed that the selector circuits for the remaining floors of the elevator system operate in a manner similar to that described for the fifth, fourth and third floors for down travel of the elevator car. Thus, it has been shown that as the elevator car moves downwardly the selector circuits notch to turn on the MEMORY element M4 associated with the floor being approached by the car and to reset the MEMORY element M4 associated with the floor above.

From the foregoing discussion, it will be appreciated that the respective sequential outputs of the OR elements R5, the MEMORY elements M4 and the NOR elements N25, as the elevator car travels from one terminal landing to the other, indicate car position and may be employed for controlling the operation of the elevator system in a manner which will be considered hereinafter. It will be appreciated further that such sequential outputs are controlled by the MEMORY element M4 set input NOR elements N21 and N22 and by the MEMORY element M4 reset input NOR elements N23 and N24. Each of the set NOR elements N21 and N22 in turn has three inputs which indicate, respectively, the direction of car travel, that the car is in the vicinity of a particular floor, and that it has reached a point intermediate the successive floors as evidenced by a notching signal as a result of the operation of the inductor notching relay Z (FIG. 1). Thus, the inputs to the set NOR elements indicate whether or not the car is approaching a particular floor. For example, the set NOR element 3N21 (FIG. 6C) for the third floor has no input energization and consequently produces an output voltage to turn on the MEMORY element 3M4 through the OR element 3R5 when the car is traveling up (the bus 311 is deenergized) from the second floor (the bus 327 is deenergized) and when the car is half-way between the second and third floors (the bus 329 is deenergized). In a similar manner, the set NOR element 3N22 has no input energization and thus produces an output voltage to turn on the MEMORY element 3M4 through the OR element 3R5 when the car is traveling down (the bus 309 is deenergized) from the fourth floor (the bus 335 is deenergized) and when the car is half-way between the fourth and third floors (the bus 325 is deenergized).

Each of the reset NOR elements N23 and N24 has two inputs which indicate, respectively, the direction of car travel and that the car is in the vicinity of a floor above or below a particular floor, as the case may be. Thus, the inputs to the reset NOR elements indicate whether or not the car is moving away from a particular floor. For example, the reset NOR element 3N23 has no input energization and consequently produces an output voltage to reset the MEMORY element 3M4 through the OR element 3R6 when the car is traveling up (the bus 311 is deenergized) and is approaching the fourth floor (the bus 335 is deenergized). Similarly, the reset NOR element 3N24 has no input energization and thus produces an output voltage to reset the MEMORY element 3M4 through the OR element 3R6 when the car is traveling down (the bus 309 is deenergized) and is approaching the second floor (the bus 327 is deenergized).

Although the selector circuits of FIGS. 6A through 6E may be forced into synchronism or step with the elevator car at any desired landing or landings of the building served by the car, in the present case it will be noted that such synchronizing is effected at the lower and upper terminal landings. Thus, as hereinbefore explained, when the car is at the lower terminal or first floor landing the switch B69 (FIG. 6A) is operated to closed condition, and this switch is open for all other positions of the elevator car. Closure of the switch B69 results in energization of the bus 305 therethrough from the bus L—. Consequently, a set input signal is applied to the MEMORY element 1M4 through the OR element 1R5 and the MEMORY element accordingly must produce an output voltage indicating that the elevator car is at the bottom landing. In addition, energization of the bus 305 results in the resetting of the respective MEMORY elements M4 for the second, third, fourth and fifth floors through their respective associated OR elements R6.

When the elevator car reaches the upper terminal or fifth floor landing, the switch T69 (FIG. 6E) is closed to energize the bus 307 therethrough from the bus L—. As a result thereof, a set input signal is applied to the MEMORY element 5M4 through the OR element 5R5, and the MEMORY element consequently must produce an output voltage indicating that the car is at the upper terminal landing. Energization of the bus 307 additionally results in the resetting of the respective MEMORY elements M4 for all floors below the fifth floor through their respective associated OR elements R6.

The synchronizing signals supplied by the switches B69 and T69 ensure synchronized operation of the selector circuits; i.e., should the selector circuits be out of step when the elevator car arrives at the lower terminal landing or the upper terminal landing, closure of the associated mechanically-operated switch assures the bringing of the selector circuits into step with the elevator car.

*FIGURE 6F*

Figure 6F:
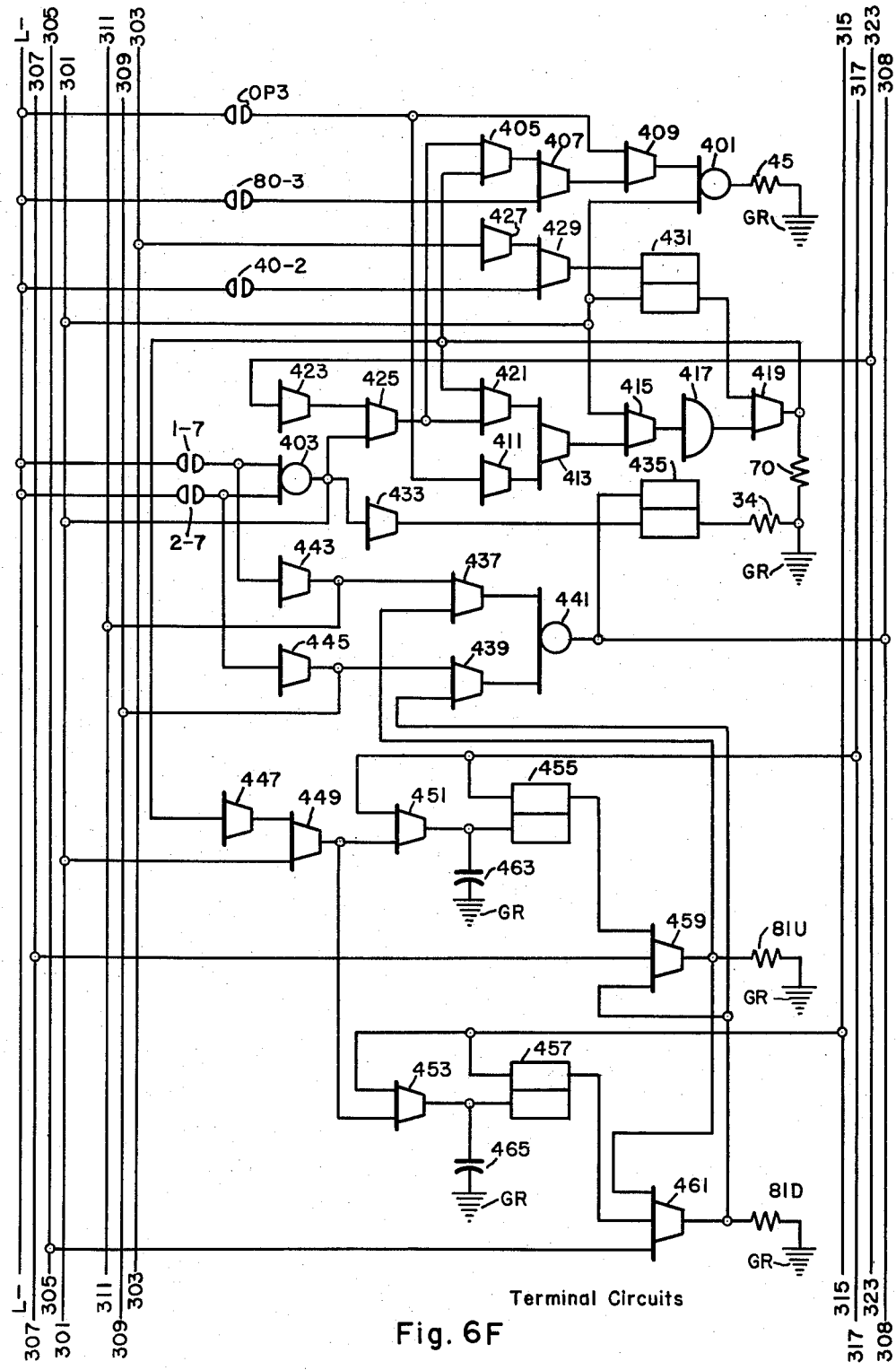
Figure 7:
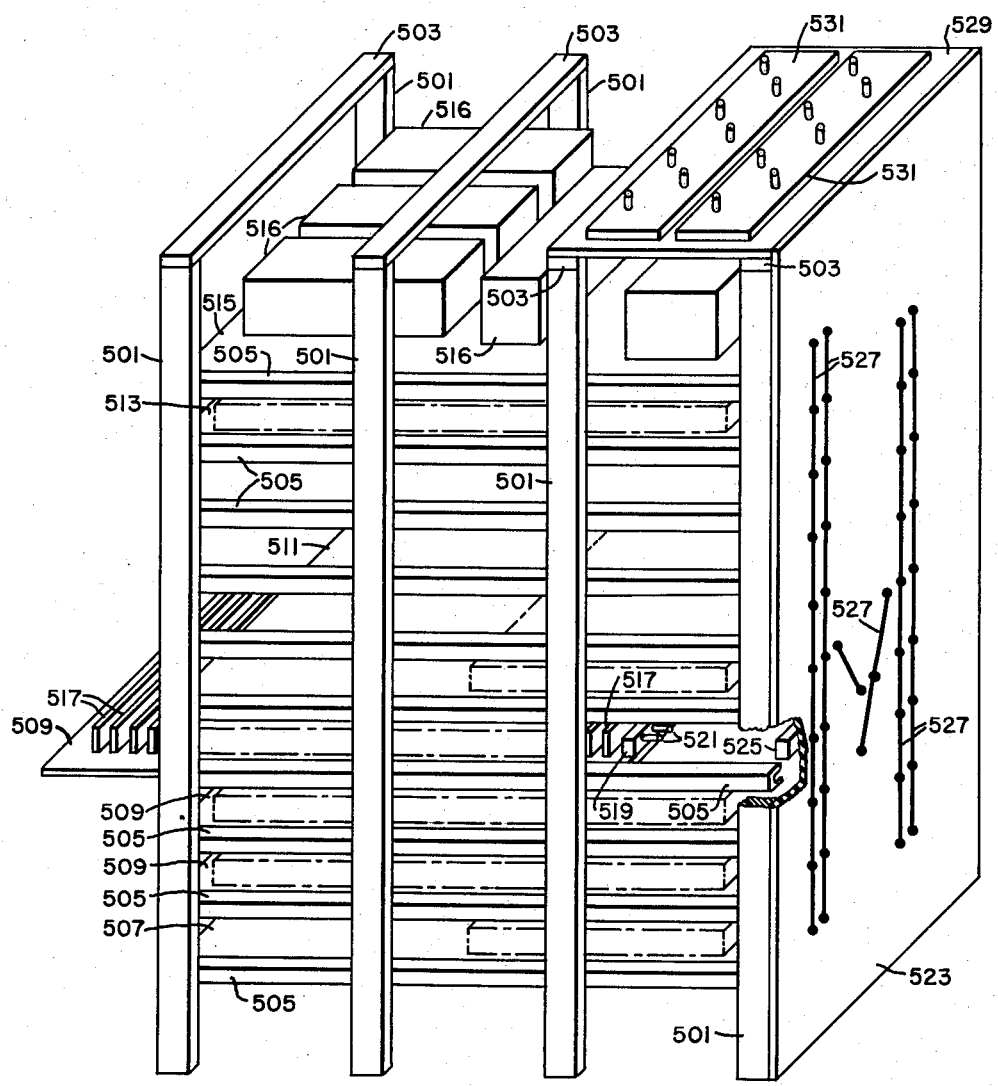

FIG. 6F is the terminal circuit schematic diagram. This drawing illustrates the terminating circuits for signals created by the static element circuits heretofore described.

In the upper portion of FIG. 6F are shown circuits for controlling the door of the elevator car. Energization and pickup of the door master relay 45 effects closure of the car door, as previously was explained in the discussion of FIG. 1.

As long as the elevator car is running, the relay 45 is energized from the bus 301 through an OR element 401 to prevent opening of the car door. The bus 301 is energized as follows: If the elevator car is moving, make contacts 1–7 or 2–7 are closed, depending upon whether the car is traveling in the up or the down direction, respectively. Such closure results in energization of the bus 301 from the bus L— through an OR element 403. When the car stops the make contacts 1–7 and 2–7 open to deenergize the bus 301.

Let it be assumed that the elevator car has just stopped at a floor in response to a call for service therefor. Under these conditions, the lower input terminal, as viewed in FIG. 6F, of a NOR element 405 is energized, as hereinafter will be apparent, to terminate its supply of energy to a NOR element 407. Since make contacts 80–3 of the master call relay 80 are open at this time, the NOR element 407 has no input signal. Consequently, this element produces an output voltage to energize an input terminal of a NOR element 409, as a result of which energization of an input terminal of the OR element 401 is terminated. Since the bus 301 also is deenergized, as aforementioned, the OR element 401 has no output. Consequently, the door master relay 45 is deenergized and drops out to effect the opening of the elevator car door, as will be apparent from the preceding discussion of FIG. 1. Such opening is accompanied by closure of make contacts OP3 of the door open relay OP to supply input energy to the NOR element 409 from the bus L—, thus insuring continued deenergization of the relay 45.

When the door arives at its fully open position, the relay OP drops out to open its make contacts OP3. Accordingly, the input energization of a NOR element 411 is terminated, as a result of which this element supplies an input signal to a NOR element 413. The output of the NOR element 413 consequently drops to zero to deenergize an input terminal of a NOR element 415. The NOR element 415, therefore, now has no input energization, and accordingly it produces an output voltage to energize the input terminal of a DELAY element 417.

It will be recalled that a DELAY element interposes a delay between the application thereto of an input signal and the production thereby of an output, and that such output may continue until the input signal is terminated. Conveniently, the DELAY element 417 may interpose a delay of approximately four seconds. Thus, until the lapse of such four-second delay, the application of input energy to the DELAY element 417 has no effect on system operation. Upon the expiration of such four-second delay, however, the DELAY element produces an output voltage, which is coupled to an input terminal of a NOR element 419. As a result thereof, the output of the NOR element 419 drops to zero to deenergize the non-interference relay 70. In addition, an input terminal of a NOR element 421 is deenergized, but such deenergization has no immediate effect on operation. Furthermore, the NOR element 419 also interrupts the supply of energy therefrom to the NOR element 405. Under the assumed conditions, the other input terminal of the NOR element 405 also is deenergized, and this element thus produces an output voltage to energize an input terminal of the NOR element 407. Consequently, the output of the NOR element 407 drops to zero. Since the NOR element 409 now has no input energy (it will be recalled that the make contacts OP3 are open at this time) it produces an output voltage to energize and pick up the door master relay 45 through the OR element 401. As explained heretofore, such pickup results in closure of the elevator car door.

It will be observed from the foregoing description of operation that, after the elevator car stops, its door moves to its fully open position and recloses subsequent to a four-second time delay. Such time delay may be designated the non-interference time and is provided to allow sufficient time for the entry and departure of elevator car passengers.

Let it be assumed that after the car door closes an up or down corridor call is registered for the floor at which the car is located. Such registration results in the energization of the bus 323, as hereinbefore explained, to provide a signal at the input terminal of a NOR element 423. Consequently, the output of this element drops to zero to deenergize an input terminal of a NOR element 425. Since the elevator car is not running, the other input terminal of the NOR element 425 also is deenergized and this element thus delivers an input signal to the NOR element 421, which has no immediate effect on system operation, and to the NOR element 405. The output of the NOR element 405 thereby drops to zero, and the door master relay 45 accordingly is deenergized and drops out by a sequence which will be apparent from the preceding discussion. Consequently, the elevator car door moves to its fully open position.

Next assume that after the car door reaches its fully open position and before the expiration of the four-second and non-interference time a passenger enters the elevator car to register a car call for another floor. As a result thereof, the bus 303 is energized to deliver an input signal to a NOR element 427, and the output of this element drops to zero. Since make contacts 40–2 are in open condition when the car door is away from its fully closed position, a NOR element 429 now has no input energization, and this element thus applies a signal to the set input terminal of a MEMORY element 431. (It will be observed that the reset input terminal of the MEMORY element 431, which is connected to the bus 301, is deenergized, since the elevator car is not running). The MEMORY element 431 consequently supplies energy to an input terminal of the NOR element 419, whose output as a result thereof drops to zero to deenergize the non-interference relay 70 and an input terminal of the NOR element 405. Since the NOR element 405 now has no input signal the door master relay 45 is deenergized by a sequence which will be apparent from the preceding discussion. Such deenergization results in the closure of the elevator car door.

The output voltage of the MEMORY element 431 may be designated the non-interference time cutout signal. From the foregoing description, it will be appreciated that this signal functions to render the non-interference time signal ineffective further to delay the pickup of the door master relay 45 and thereby the closure of the elevator car door. Such operation results in the expediting of elevator service.

In the middle portion of FIG. 6F are shown the stopping circuits for the elevator car. If the bus 301 is energized from the bus L— through the make contacts 1–7 or 2–7 and the OR element 403 to indicate that the elevator car is running, input energy is supplied therefrom to a NOR element 433. As a result thereof, the reset input terminal of a MEMORY element 435 is deenergized. If the bus 308 is energized to indicate that a call for elevator service is registered for the floor being approached by the elevator car which may be answered by the approaching elevator car, a signal is applied to the set input terminal of the MEMORY element 435. Consequently, this element produces a voltage at its on output terminal to energize the stopping relay 34. Such energization results in the stopping of the elevator car at the aforementioned floor.

A NOR element 437 or a NOR element 439 effects the stopping of the elevator car when it is traveling in the up direction in response to the highest down corridor call or when it is traveling in the down direction in response to the lowest up corridor call, respectively. For example, if the car is traveling in the up direction, the make contacts 1–7 are closed to energize the input terminal of a NOR element 443 from the bus L—. This element consequently deenergizes an input terminal of the NOR element 437. As the elevator car approaches the floor for which the highest down corridor call is registered, the other input to the NOR element 437 also becomes zero. Consequently, this element produces an output voltage to energize the set input terminal of the MEMORY element 435 through an OR element 441, as a result of which the stopping relay 34 is energized.

If, on the other hand, the elevator car is moving in the down direction, the make contacts 2–7 are closed to energize the input terminal of a NOR element 445 from the bus L—. The output of this element thus drops to zero to interrupt the supply of energy therefrom to an input terminal of the NOR element 439. As the car approaches the floor for which the lowest up corridor call is registered, the other input terminal of the NOR element 439 is deenergized, and this element accordingly supplies a signal to the set input terminal of the MEMORY element 435 through the OR element 441. As a result thereof, a voltage appears at the on output terminal of the MEMORY element to energize the stopping relay 34.

The up and down direction preference circuits for the elevator car are illustrated in the lower portion of FIG. 6F. Let it be assumed that the elevator car is not moving, that it is located at an intermediate floor, that its door is closed and that no call for elevator service is registered. It will be understood that under these conditions the buses 301, 305, 307, 315 and 317 are deenergized and that the output of the NOR element 419 is zero. Consequently, a NOR element 447 produces an output voltage to energize an input terminal of a NOR element 449, whose output thus is zero. Since the buses 315 and 317 are deenergized, each of a pair of NOR elements 451 and 453 has no input signal. As a result thereof, reset input signals are applied to MEMORY elements 455 and 457, which in turn respectively supply input energy to NOR elements 459 and 461. Accordingly, both the up direction preference relay 81U and the down direction preference relay 81D are deenergized and dropped out.

Assume now that a call for service is registered for a floor above the floor at which the elevator car is located. Upon such registration, the bus 317 is energized to supply a signal to an input terminal of the NOR element 451 and to the set input terminal of the MEMORY element 455. Consequently, that input terminal of the NOR element 459 which is connected to the off output terminal of the MEMORY element 455 is deenergized. Since no input energy now is supplied to the NOR element 459, this element produces an output voltage to energize and pick up the up direction preference relay 81U, thus conditioning the elevator car for up travel.

It will be noted that the output voltage of the NOR element 459 also is applied to an input terminal of the NOR element 461. Consequently, when the elevator car is conditioned for up travel, the down direction preference relay 81D cannot be energized and picked up.

Let it be assumed in the previous example that, instead of a call for service being registered for a floor above the floor at which the elevator car is located, a call for service is registered for a floor below the floor at which the car is located. As a result thereof, the bus 317 is deenergized, while the bus 315 is energized. Under these conditions, the MEMORY element 455 is reset. In addition, the output voltage of the NOR element 453 drops to zero to interrupt the supply of energy to the reset input terminal of the MEMORY element 457, while the set input terminal thereof is energized. Consequently, the NOR element 461 has no input energization, and this element produces an output voltage to energize and pick up the down direction preference relay 81D thus conditioning the elevator car for down travel. It will be noted that the output voltage of the NOR element 461 also is applied to an input terminal of the NOR element 459. Accordingly, when the elevator car is conditioned for down travel, the up direction preference relay 81U must be deenergized and dropped out.

If the elevator car is located at the first or lower terminal floor, the bus 305 is energized. This results in the application of an input signal to the NOR element 461 to ensure the deenergization of the down direction preference relay 81D, thus preventing downward movement of the car from the first floor. If, however, the car is located at the fifth or upper terminal floor, the bus 307 is energized, resulting in the application of an input signal to the NOR element 459 to ensure that under this condition the up direction preference relay 81U cannot be energized and picked up. Consequently, the elevator car is prevented from moving upwardly from the fifth floor.

Let it be assumed that the elevator car is traveling in the up direction in response to the registration of an up corridor call for service for an intermediate floor and that no other call for service is registered. Under these conditions the buses 301 and 317 are energized to indicate, respectively, that the car is moving and that a call for service for a floor above the location of the car is registered. In addition, the input terminal of the NOR element 447 is energized. As the car stops at the floor for which the up corridor call is registered, the buses 301 and 317 are deenergized; but the input terminal of the NOR element 447 remains energized until approximately four seconds after the car stops due to operation of the DELAY element 417, as heretofore explained. Consequently, during this four-second period the reset input terminal of the MEMORY element 455 remains deenergized. Since the MEMORY element is not reset during such period, the up preference relay 81U remains energized and picked up. Such operation enables the passenger who registered the up corridor call to enter the elevator car and register a car call for a floor above while the car remains conditioned for up travel. It will be observed that the circuits associated with the down direction preference relay 81D operate in a similar manner when the elevator car is conditioned for down travel.

Under certain conditions, as the elevator car stops at the aforementioned intermediate floor for which the up corridor call was registered, it may be possible for the signal at that input terminal of the NOR element 451 which is connected to the bus 317 to drop to zero faster than the signal at that input terminal of the NOR element 449 which is connected to the bus 301. Under these conditions, a voltage pulse will appear at the output terminal of the NOR element 451 to reset, in the absence of a capacitor 463, the MEMORY element 455, which in turn results in deenergization of the up preference relay 81U. Such deenergization effects the loss of up directional preference for the elevator car before the passenger who registered the up corridor call for the floor at which the car has stopped may register a car call for a floor above. The capacitor 463, which is connected between the output terminal of the NOR element 451 and ground GR, prevents the aforementioned voltage pulse from having such effect; i.e., if such a voltage pulse does appear at the output terminal of the NOR element 451, it will be filtered to ground by the capacitor 463. A capacitor 465 is connected between the output terminal of the NOR element 453 and ground GR to prevent a loss of directional preference when the elevator car is conditioned for down travel in a manner similar to that described for the capacitor 463.

*Operation*

In order to assure a full understanding of the invention, certain typical operations of the elevator system now will be considered. First it will be assumed that the buses L— and L+ are energized, that the elevator car A is positioned at the lower terminal or first floor landing, that the door AD of the car is fully closed and that no call for service is registered. Referring to FIG. 1, it will be understood that under these conditions the relays 1, 2, 80, OP and CL are dropped out, and the relay 40 is energized and picked up. Furthermore, the door motor armature 31A is deenergized, while the door motor field 31F and the coil of the inductor notching relay Z are energized. In addition, the cam-operated switch 17 is in open condition, while the cam-operated switch B69 is in closed condition to energize the bus 305 (FIGS. 6A through 6F). From the preceding discussion, it will be appreciated that the MEMORY element 1M4 (FIG. 6A) is turned on through the OR element 1R5, while the MEMORY elements 2M4 through 5M4 for the second through fifth floors, respectively, are reset through their respective associated OR elements 2R6 through 5R6.

Turning now to FIG. 6F, for the reasons set forth in the previous discussion thereof, the door master relay 45 is energized and picked up. However, the stopping relay 34 and the up and down direction preference relays 81U and 81D, respectively, are deenergized and dropped out. Moreover, by inspection of the drawings it will be observed that the buses 301, 303, 307, 308, 315, 317 and 323 are deenergized while the buses 309, 311, 325, and 329 are energized.

Next, assume that a prospective passenger at the first floor registers an up corridor call therefor by pressing and subsequently releasing the push button 1U (FIG. 6A). The pressing and releasing of the push button has no effect on the output of the MEMORY element 1M3 for the reason that the reset input terminal of this element remains energized from the NOR element 1N2. The pressing of the push button 1U, however, results in the energization of the bus 323 through the OR element 1R4 from the NOR element 1N20, since the last-named element has no input signal when the push button is pressed.

Returning to FIG. 6F, energization of the bus 323 results in the dropout of the door master relay 45 by a sequence which will be apparent from the preceding discussion. Consequently, the break contacts 45–1 (FIG. 1) close to energize the door open relay OP through the now closed limit switch 32; and the make contacts 45–2 open to prevent energization therethrough of the door close relay CL. Pickup of the relay OP is accompanied by closure of its make contacts OP1 and OP2 to energize the door motor armature 31A. As a result thereof, the door motor shaft 31S rotates in the proper direction to open the elevator car door AD. As the door moves away from its fully closed position, the limit switch 33 closes, but such closure has no effect, since the make contacts 45–2 now are open.

Returning again to FIG. 6F, pickup of the door open relay OP also is accompanied by the closure of its make contacts OP3. Such closure results in the energization and pickup of the non-interference relay 70 by a sequence which will be apparent from the preceding discussion. Although the releasing of the first floor up corridor call push button 1U resulted in deenergization of the bus 323, closure of the contacts OP3 also effects the application of an input signal to the NOR element 409 from the bus L— to ensure continued deenergization of the door master relay 45. Deenergization of the bus 323 additionally caused the output of the NOR element 425 to drop to zero, but the output terminal of the NOR element 419 remains energized by virtue of the connection therefrom to one of the input terminals of the NOR element 421. Consequently, the non-interference relay 70 remains picked up. Likewise, the application of the output of the NOR element 419 to one of the input terminals of the NOR element 405 maintains the door master relay 45 in deenergized condition, in conjunction with the input signal to the NOR element 409 through the contacts OP3. (It will be recalled that the master call relay 80 is dropped out at this time and that its make contacts 80–3, therefore, are open.) Thus, the door of the elevator car continues to move toward its fully open position.

When the door reaches such position, the limit switch 32 (FIG. 1) opens to deenergize the door open relay OP. Upon dropout of the relay OP, its make contacts OP1 and OP2 open to deenergize the door motor armature 31A, and consequently the shaft 31S ceases to rotate.

Dropout of the relay OP also is accompanied by the opening of its make contacts OP3 (FIG. 6F) to deenergize one of the input terminals of the NOR element 409, but such deenergization has no immediate effect on the operation of the door master relay 45 for reasons which hereinafter will be apparent.

Opening of the contacts OP3 additionally results in the removal of the input signal to the NOR element 411. Consequently, this element produces an output voltage, which in turn causes the output of the NOR element 413 to drop to zero. Since no input energization now is supplied to the NOR element 415, this element produces an output voltage to energize the input terminal of the DELAY element 417. Inasmuch as it is assumed that the delay element 417 interposes a four-second delay between the application thereto of an input signal and the production thereby of an output voltage, the NOR element 419 during such time delay continues to have no input energization. Accordingly, this element continues to produce an output voltage to maintain the non-interference relay 70 picked up for the four-second period and to maintain the door master relay 45 dropped out for such period.

Next it will be assumed that after the elevator car door is fully open the prospective passenger who pressed the push button 1U enters the elevator car and presses the car call push button 4C (FIG. 6D) therein to register a car call for the fourth floor before the expiration of the four-second non-interference time. The pressing of the push button 4C results in the energization of the bus 303 therethrough from the bus L—. Consequently, an input signal is provided for the NOR element 427 (FIG. 6F), whose output thereby drops to zero. Since the make contacts 40–2 of the door safety relay 40 opened as the door moved away from its fully closed position, the NOR element 429 supplies energy to the set input terminal of the MEMORY element 431. As a result thereof, the MEMORY element produces a non-interference time cutout signal to energize one of the input terminals of the NOR element 419. The output of the NOR element 419 consequently drops to zero to deenergize and drop out the non-interference relay 70 and to effect energization and pickup of the door master relay 45.

Closure of the break contacts 70–1 (FIG. 1) has no immediate effect on system operation. Closure of the make contacts 45–2 results in the pickup of the door close relay CL, whose make contacts CL1 and CL2 close to energize the door motor armature 31A in the proper direction to close the elevator car door. It thus will be observed that the pressing of the fourth floor car call push button results in the closure of the car door, although the non-interference time has not expired.

The pressing of the push button 4C (FIG. 6D) also results in the application of energy therethrough from the bus L— to the set input terminal of the MEMORY element 4M1. Consequently, this element applies a signal to the input terminal of the NOR element 4N3, whose output thus drops to zero. Such change, however, does not at this time affect the operation of the NOR element 4N7, inasmuch as the other input terminal of this element remains energized, as will be appreciated from the discussion hereinbefore of the individual drawings. Since the elevator car is not located at the fourth floor, however, the NOR element 4N13 now has no input signal, as a result of which this element produces an output voltage to energize the bus 317 through the OR element 4R2. (It will be observed that one input terminal of the NOR element 4N16 remains energized to prevent energization of the bus 315 at this time.)

Energization of the bus 317 results in the energization and pickup of the up direction preference relay 81U (FIG. 6F), as heretofore explained. Closure of the make contacts 81U2 (FIG. 1) results in the energization and pickup of the master call relay 80 through the now closed break contacts 70–1. Closure of the make contacts 80–2 partially completes a holding circuit for the relay 80.

Closure of the make contacts 81U1 and 80–1 completes the following energizing circuit for the up switch 1:

L—, 34–1, 1, 2–4, 27, 81U1, 80–1, 40–1, L+

(It will be recalled that when the elevator car door reached its fully closed position the door safety relay 40 picked up to close its make contacts 40–1.) As a result of its energization, the up switch 1 picks up, thereby closing its make contacts 1–1, 1–2, and 1–3 to release the brake 15 and to apply alternating energy to the car motor 11 with proper phasing for rotation for up travel of the elevator car. The car thus accelerates in the up direction.

The up switch 1 also opens its break contacts 1–4 to prevent energization therethrough of the down switch 2. Additionally, the up switch closes its make contacts 1–5 to establish a holding circuit around the contacts 81U1 and 80–1 and its make contacts 1–6 to complete the holding circuit for the master call relay 80.

Finally, the up switch 1 closes its make contacts 1–7 (FIG. 6F) to energize the bus 301 through the OR element 403 to indicate that the elevator car is running. From the foregoing discussion, it will be appreciated that the make contacts OP3 and 2–7 now are in open condition, while the make contacts 80–3, 40–2 and 1–7 are in closed condition. As a result of the opening of the contacts OP3 and the closure of the contacts 80–3, the NOR element 409 has no input signal. Consequently, this element produces an output voltage, which, together with energy from the bus 301, maintains the door master relay 45 picked up through the OR element 401 as long as the elevator car is running. Closure of the make contacts 40–2 results in the application therethrough of an input signal to the NOR element 429 from the bus L— to prevent the application of a set input signal to the MEMORY element 431 until the elevator car door reopens. Furthermore, a resetting input signal is applied to the MEMORY element from the now energized bus 301, and thus the MEMORY element supplies no input energy to the NOR element 419. The bus 301 also supplies input energy to the NOR element 415 to prevent this element from supplying an input signal to the NOR element 419. Thus, the NOR element 419 has no input energization, and accordingly it produces an output voltage to energize and pick up the non-interference relay 70. The NOR element 419 also applies an input signal to the NOR element 405, but such signal has no immediate effect on system operation.

It will be noted that the OR element 403 also supplies input energy to the NOR element 425 without immediately affecting system operation. In addition, the OR element supplies energy to the input terminal of the NOR element 433 to terminate the resetting input signal to the MEMORY element 435, thus preparing the MEMORY element for subsequent energization of the stopping relay 34. Furthermore, closure of the make contacts 1–7 also is accompanied by input energization of the NOR element 443. Consequently, the output voltage of this element drops to zero to deenergize an input terminal of the NOR element 437 and the bus 311, indicating that the car is traveling up. Such changes, however, have no immediate effect on system operation.

Returning to FIG. 1, opening of the break contacts 70–1 upon pickup of the non-interference relay does not affect system operation for the reason that energization of the master call relay 80 is maintained through its holding circuit comprising the now closed make contacts 80–2 and 1–6. As the elevator car leaves the first floor, the cam follower 18 of the switch 17 disengages the cam 19. Consequently, the switch closes to parallel the closed break contacts 34–1. In addition, the cam 24 disengages the cam follower of the switch B69, and this switch opens to terminate energization of the bus 305 (FIG. 6A) and thus of the set input terminal of the MEMORY element 1M4 through the OR element 1R5. Deenergization of the bus 305 also results in termination of the input signal to the NOR element 1N1; and this element consequently delivers energy to the NOR element 1N2 without affecting operation, since the last-named element already has an input signal, as a result of the previously discussed energization of the bus 301, to interrupt the respective resetting input signals to the call storage MEMORY elements 1M1 and 1M3. Furthermore, deenergization of the bus 305 terminates the resetting input signals to the MEMORY elements M4 for all floors above the first floor.

Let it be assumed that immediately after the elevator car leaves the first floor a prospective passenger who desires down service from the second floor presses the second floor down corridor call push button 2D (FIG. 6B). As a result thereof, the set input terminal of the MEMORY element 2M2 is energized through the push button from the bus L—. Consequently, the MEMORY element operates to store the down corridor call, and a voltage thus appears at the on output terminal of the MEMORY element to terminate the output of the NOR element 2N4. Such change has no effect on the operation of the NOR elements 2N8 and 2N17; but since both input terminals of the NOR element 2N14 now are deenergized, this element delivers energy to the bus 317 through the OR element 2R2. It will be recalled, however, that the bus 317 already is energized as a result of the previously registered car call for the fourth floor. Accordingly, the production of an output voltage at this time by the NOR element 2N14 has no effect on system operation. The effect of the storage of the second floor down corridor call by the MEMORY element 2M2 will be considered hereinafter.

As the elevator car continues to move upwardly, the inductor notching relay Z (FIG. 1) passes the inductor plate ZP1 when the car is located half-way between the first and second floors. Consequently, the break contacts Z1 open momentarily to deenergize the bus 325. Recalling that the bus 321 (FIGS. 6A and 6B) is deenergized when the bus 325 initially is deenergized and that the bus 311 is deenergized at this time, the NOR element 2N21 (FIG. 6B) momentarily has no input signal. As a result thereof, this element supplies energy to the input terminal of the NOR element 2N6 through the OR element 2R5. The output of the NOR element 2N6 thus drops to zero, but such change has no immediate affect on system operation for the reason that one or more of the input terminals of each of the NOR elements 2N7, 2N8 and 2N9 remain energized.

The NOR element 2N21 also supplies energy to the set input terminal of the MEMORY element 2M4 through the OR element 2R5. Consequently, the voltage at the off output terminal of the MEMORY element drops to zero to deenergize one of the input terminals of the NOR element 2N2. Such deenergization, however, has no effect on operation, since the other input terminal of the NOR element 2N2 remains energized from the bus 301. The MEMORY element 2M2, therefore, continues to store the previously registered second floor down corridor call.

Returning to the MEMORY element 2M4, the application of the signal to its set input terminal also results in the energization of its on output terminal. Consequently, energy is supplied to an input terminal of the NOR element 2N11 to maintain the output of this element at zero, despite subsequent deenergization of the other input terminal thereof. The MEMORY element 2M4 also supplies energy to the input terminal of the NOR element 2N25, and the output of this element, therefore, drops to zero to deenergize the bus 327. Since the NOR element 1N23 (FIG. 6A) now has no input signal, this element produces an output voltage to reset the MEMORY element 1M4 through the OR element 1R6. The consequent energization of the bus 321 by the NOR element 1N25 has no immediate effect upon the operation of the MEMORY element 2M4, as will be apparent by inspection of FIG. 6B. It will be noted, however, that as a result of such energization the output of the NOR element 2N10 drops to zero to deeneregize an input terminal of the NOR element 2N17. Since the MEMORY element 2M2 continues to store the down corridor call for the second floor, the NOR element 2N17 now has no input signal. Accordingly, this element produces an output voltage to energize the bus 315 through the OR element 2R3.

Referring to FIG. 6F, energization of the bus 315 has no effect at this time on the operation of the down direction preference relay 81D for the reason that an input terminal of the NOR element 461 remains energized by the output voltage of the NOR element 459. Thus, despite energization of the bus 315, the elevator car cannot reverse its direction of travel until the output of the NOR element 459 drops to zero to deenergize the up direction preference relay 81U.

Turning to FIG. 6C, it will be observed that the aforementioned deenergization of the bus 327 has no immediate effect on the operation of the NOR elements 3N21 and 3N24 for the reason that the buses 329 and 309, respectively, remain energized as the elevator car approaches the second floor. Since no call for service is registered at the second floor which the car may answer in its direction of travel, the car continues to move past the second floor, bypassing the down corridor call therefor, toward the third floor. (It will be noted by reference to FIG. 1 that engagement of the cam 20 by the cam follower 18 to open the switch 17 as the car approached the second floor landing had no effect on operation, since the break contacts 34–1 in parallel with the switch remained closed.)

Assume that a prospective passenger at the third floor now presses the up corridor call push button 3U (FIG. 6C) to indicate his desire for up elevator service from the third floor. The pressing of the push button results in interruption of the supply of energy from the NOR element 3N5 to one of the input terminals of the NOR element 3N9.

When the elevator car is located half-way between the second and third floors, the break contacts Z2 of the inductor notching relay Z (FIG. 1) open momentarily to deenergize the bus 329. Consequently, the NOR element 3N21 (FIG. 6C) momentarily has no input signal, and this element, therefore, produces an output voltage to turn on the MEMORY element 3M4 through the OR element 3R5. Such operation results in the resetting of the MEMORY element 2M4 (FIG. 6B) by a sequence which will be apparent from the preceding discussion of the resetting of the MEMORY element 1M4 for the first floor.

The output voltage of the NOR element 3N21 (FIG. 6C) also is applied to the input terminal of the NOR element 3N6 through the OR element 3R5. Consequently, the NOR element 3N9 momentarily has no input signal and this element thus produces an output voltage to energize the bus 308 through the OR element 3R1. Energization of the bus 308 results in the application of a signal to the set input terminal of the MEMORY element 435 (FIG. 6F). Since the reset input terminal of the MEMORY element is deenergized at this time, the MEMORY element produces a voltage at its on output terminal to energize and pick up the stopping relay 34.

Opening of the break contacts 34–1 (FIG. 1) prepares the up switch 1 for subsequent deenergization. As the elevator car continues its movement toward the third floor, the cam folower 18 of the switch 17 engages the cam 21. The switch 17 consequently opens to deenergize the up switch 1, whose make contacts 1–1, 1–2 and 1–3 thereby open to deenergize the car motor 11 and the coil of the brake 15. Thus, the elevator car stops accurately at the third floor. Closure of the break contacts 1–4 has no immediate effect on operation, while opening of the make contacts 1–5 interrupts the holding circuit for the up switch. Opening of the make contacts 1–6 results in the deenergization and dropout of the master call relay 80, and this relay opens its make contacts 80–1 and 80–2 without immediately affecting system operation.

Turning now to FIG. 6F, opening of the make contacts 1–7 and 80–3 results in the dropout of the door master relay 45, by a sequence which will be apparent from the preceding discussion, to initiate an opening operation of the elevator car door. In addition, when the contacts 1–7 open, the supply of energy to the input terminal of the NOR element 433 is interrupted. Consequently, the MEMORY element 435 is reset to deenergize and drop out the stopping relay 34, whose break contacts 34–1 (FIG. 1) close to prepare the up switch 1 for subsequent energization. It also will be observed that the opening of the contacts 1–7 to deenergize the bus 301 has no effect on the operation of the MEMORY element 455, since the bus 317 remains energized as a result of the previous registration of the car call for the fourth floor, which remains unanswered at this time. Furthermore, by observation of the drawings, it will be appreciated that energization of the bus 311, upon the interruption of energy to the input terminal of the NOR element 443 when the contacts 1–7 open, has no immediate effect on the operation of the elevator car.

Returning to FIG. 6C, as a result of the deenergization of the bus 301, the NOR element 3N2 has no input signal. (It will be recalled that the MEMORY element 3M4 was turned on as the elevator car approached the third floor to deenergize one of the input terminals of the NOR element 3N2. Consequently, the NOR element 3N2 produces an output voltage to reset the MEMORY element 3M3, thus cancelling the third floor up corridor call which was stored by the MEMORY element when the push button 3U was released.

It will be assumed that the prospective passenger who registered the third floor up corridor call desires transportation to the fourth floor. When the door of the elevator car arrives at its fully open position, such passenger enters the car. It will be recalled, however, that a car call for the fourth floor already has been registered by the passenger who entered the car at the first floor. Thus, the passenger who enters the car at the third floor need not press the push button 4C (FIG. 6D) to secure the service he desires. If such be the case, the car door will close at the expiration of the four-second non-interference time, as previously explained. If, on the other hand, the passenger does press the push button 4C, the bus 303 will be energized through the push button from the bus L—. As a result thereof, the car door immediately will close due to operation of the NOR elements 427 and 429, the MEMORY element 431, and the NOR element 419 (FIG. 6F), as discussed heretofore.

Assuming that the car door has reached its fully closed position, the elevator car accelerates toward the fourth floor by a sequence of operations which will be apparent from the previous discussion of the starting of the car at the first floor. When the car is located half-way between the third and fourth floors, the inductor notching relay Z (FIG. 1) passes the inductor plate ZP3, as a result of which the break contacts Z1 open momentarily to deenergize the bus 325. Such deenergization effects the resetting of the MEMORY element 3M4 (FIG. 6C) and the turning on of the MEMORY element 4M4 (FIG. 6D) for the fourth floor by a sequence which will be apparent from the preceding discussion. In addition, the input terminal of the NOR element 4N6 is energized to deenergize one of the input terminals of the NOR element 4N7. Since a car call has been registered for the fourth floor, the NOR element 4N7 now has no input signal. As a result thereof, this element produces an output voltage to energize the bus 308 through the OR element 4R1. Consequently, voltage is applied to the set input terminal of the MEMORY element 435 (FIG. 6F) to energize and pick up the stopping relay 34. Accordingly, the elevator car stops accurately at the fourth floor by a sequence of operations which will be apparent from the preceding discussion of the stopping of the car at the third floor. As the car stops at the fourth floor, the make contacts 1–7 open to deenergize the bus 301, as a result of which the MEMORY element 4M1 (FIG. 6D) is reset by the NOR element 4N2 to cancel the car call for the fourth floor.

Let it be assumed in the preceding example that the elevator car is approaching the fourth floor in the up direction of travel in response to the registration of a down corridor call therefor by the previous pressing of the push button 4D, that no car call or up corridor call is registered for the fourth floor and again that no call for elevator service is registered for the fifth floor. Under these conditions, the bus 317 is energized through the OR element 4R2 by the NOR element 4N14, which now has no input signal. When the elevator car is located half-way between the third and fourth floors, the MEMORY element 3M4 (FIG. 6C) is reset as heretofore noted, and the voltage at its on output terminal thus drops to zero. Consequently, the NOR element 3N11 has no input signal, and this element produces an output voltage to energize the bus 319. Such energization results in the application of an input signal to the NOR element 4N14 (FIG. 6D), whose output thereby drops to zero to deenergize the bus 317. Additionally, the bus 319 furnishes input energy to the NOR element 4N10, whose output thus drops to zero to deenergize an input terminal of the NOR element 4N17. Since the other input terminal of the NOR element 4N17 also is deenergized (the MEMORY element 4M2, which was turned on when the push button 4D was pressed, cannot be reset until the elevator car stops at the fourth floor), this element energizes the bus 315 through the OR element 4R3.

Turning to FIG. 6F, it will be noted that both input terminals of the NOR element 451 and the set input terminal of the MEMORY element 455 all are deenergized. Consequently, the MEMORY element 455 is reset, and a voltage appears at its off output terminal, which causes the output voltage of the NOR element 459 to drop to zero to deenergize and drop out the up direction preference relay 81U. (Inspection of FIG. 1 will reveal that such dropout has no immediate effect on system operation for the reason that the up switch 1 and the master call relay 80 are maintained energized and picked up through their respective holding circuits.) However, energization of the bus 315 results in the application of a signal to an input terminal of the NOR element 453 and to the on input terminal of the MEMORY element 457. Consequently, the NOR element 461 has no input signal, and this element thus produces an output voltage to energize and pick up the down direction preference relay 81D. (Inspection of FIG. 1 will reveal that closure of the make contacts 81D1 has no immediate effect on system operation for the reason that the break contacts 1–4 remain open to prevent energization therethrough of the down switch 2. The make contacts 81D2 close merely to establish a parallel energizing circuit for the master call relay 80.)

In addition, it will be observed that the NOR element 437 now has no input signal, as a result of which it supplies energy to the set input terminal of the MEMORY element 435 through the OR element 441. Consequently, the stopping relay 34 picks up to a stop the elevator car at the fourth floor by a sequence which will be apparent from the preceding discussion. It will be noted that in this example the elevator car during up travel thereof has stopped at the highest floor for which a down corridor call is registered.

As the car stops at the fourth floor in response to the registered down corridor call therefor, the MEMORY element 4M2 (FIG. 6D) is reset by the NOR element 4N2. Consequently, the NOR element 4N4 produces an output voltage to energize an input terminal of the NOR element 4N17; and the output of the latter element thus drops to zero to deenergize the bus 315 through the OR element 4R3. Returning to FIG. 6F, it will be observed that the on input terminal of the MEMORY element 457 now is deenergized. As explained heretofore, however, the input terminal of the NOR element 447 remains energized until approximately four seconds after the elevator car stops due to operation of the DELAY element 417. Consequently, during this four-second period, the NOR element 449 has no input signal (it will be recalled that the bus 301 is deenergized when the car is stopped), and this element thus produces an output voltage to energize an input terminal of the NOR element 453. As a result thereof, the reset input terminal of the MEMORY element 457 is maintained deenergized. Although the MEMORY element now has no input signal, its on input terminal was the last input terminal thereof to be energized. Thus, until the four-second non-interference time expires the down direction preference relay 81D remains energized and picked up. Such operation enables the passenger who registered the down corridor call for the fourth floor to enter the elevator car and register a car call for a floor below while the car remains conditioned for down travel.

The NOR element 439 operates in a manner similar to that described for the NOR element 437 to stop the elevator car during down travel thereof at the lowest floor for which an up corridor call is registered, provided no call is registered which requires further down travel of the car, as will be apparent by inspection of the drawings. Likewise, under such conditions the direction preference circuits of FIG. 6F operate in a manner similar to that above described for changing the direction of car travel.

Returning to the preceding exmple, wherein the elevator car stopped at the fourth floor in response to the registration of the car call therefor, upon the resetting of the MEMORY element 4M1 (FIG. 6D) to cancel such car call, the NOR element 4N3 produces an output voltage to energize one of the input terminals of the NOR element 4N13. Consequently, the output of the NOR element 4N13 drops to zero to deenergize the bus 317. Such deenergization, however, has no effect upon the off output of the MEMORY element 455 (FIG. 6F) until the four-second non-interference time expires, after the opening of the elevator car door, to terminate the input signal of the NOR element 447. Thus, until such expiration, the up direction preference relay 81U remains energized and picked up.

When the non-interference time does expire, however, the MEMORY element 455 is reset to deenergize and drop out the relay 81U. It will be recalled that the bus 315 is energized as a result of the previously mentioned registration of the down corridor call for the second floor, which at this time remains unanswered. Thus, the set input terminal of the MEMORY element 457 is energized, while the reset input terminal thereof is deenergized. Since the NOR element 461 now has no input signal, this element produces an output voltage to energize and pick up the down direction preference relay 81D.

Turning to FIG. 1, closure of the make contacts 81D2 results in the energization of the master call relay 80 through the now closed break contacts 70–1, and this relay closes its make contacts 80–2 partially to establish a holding circuit therefor. Upon closure of the elevator car door after the passengers who desired transportation to the fourth floor have departed the car, the door safety relay 40 picks up to close its make contacts 40–1 to establish the following energizing circuit for the down switch 2:

L–, 34–1, 2, 1–4, 28, 81D1, 80–1, 40–1, L+

Pickup of the down switch results in the closure of its make contacts 2–1, 2–2 and 2–3 to release the brake 15 and to apply alternating energy to the car motor 11 with proper phasing for down travel of the elevator car. The car consequently accelerates from the fourth floor in the down direction. Thus, it wil be observed that the car has reversed its direction of travel at the fourth floor in response to the as yet unanswered down corridor call for the second floor.

Opening of the break contacts 2–4 prevents subsequent energization therethrough of the up switch 1, while closure of the make contacts 2–5 establishes a holding circuit for the down switch 2 around the contacts 81D1 and 80–1. Closure of the make contacts 2–6 completes the holding circuit for the master call relay 80.

Referring now to FIG. 6F, closure of the make contacts 2–7 results in energization of the bus 301 through the OR element 403, in termination of the resetting input signal to the MEMORY element 435 from the NOR element 433 and in deenergization of the bus 309. Energization of the bus 301 results in the application of an input signal to the NOR element 415 to energize and pickup the non-interference relay 70 by a sequence which will be apparent from the preceding discussion. Pickup of the relay 70, however, has no immediate effect on system operation.

Energization of the bus 301 and closure of the make contacts 80–3 as a result of the previously described pickup of the master call relay 80 ensures that the door master relay 45 remains energized and picked up through the OR element 401 while the elevator car is moving.

As the car moves downwardly from the fourth floor, the inductor notching relay Z (FIG. 1) passes the inductor plate ZP3 momentarily to open the break contacts Z1, thus deenergizing the bus 325. As a result of such deenergization, the NOR element 3N22 (FIG. 6C) momentarily has no input signal and this element thus produces an output voltage to energize the set input terminal of the MEMORY element 3M4 through the OR element 3R5. The MEMORY element in turn produces a voltage at its on output terminal to energize the input terminal of the NOR element 3N25, which results in deenergization of the bus 331. Consequently, the NOR element 4N24 (FIG. 6D) has no input signal. Accordingly, energy is supplied to the reset input terminal of the MEMORY element 4M4 through the OR element 4R6 to reset the MEMORY element.

Since no call for service is registered for the third floor, the elevator car continues to move downwardly. When the inductor notching relay Z (FIG. 1) passes the inductor plate ZP2 as the car approaches the second floor, the break contacts Z2 momentarily open to deenergize the bus 329. As a result thereof, the NOR element 2N22 (FIG. 6B) momentarily has no input signal, and this element produces an output voltage to energize the set input terminal of the MEMORY element 2M4 through the OR element 2R5. Consequently, the MEMORY element 3M4 (FIG. 6C) is reset in a manner which will be apparent from the preceding discussion of the resetting of the MEMORY element 4M4 for the fourth floor. In addition, the output voltage of the OR element 2R5 (FIG. 6B) is applied to the input terminal of the NOR element 2N6. Accordingly, the NOR element 2N8 has no input signal, and this element thus produces an output voltage to energize the bus 308 through the OR element 2R1.

Turning now to FIG. 6F, energization of the bus 308 results in the turning on of the MEMORY element 435 to energize and pick up the stopping relay 34. Consequently, the break contacts 34–1 (FIG. 1) open to prevent subsequent energization therethrough of the down switch 2. As the elevator car continues to approach the second floor, the cam follower 18 of the switch 17 engages the cam 20. Opening of the switch 17 results in deenergization and dropout of the down switch 2, whose make contacts 2–1, 2–2 and 2–3 open to deenergize the car motor 11 and to apply the brake 15. Consequently, the elevator car stops accurately at the second floor.

Opening of the make contacts 2–7 (FIG. 6F) effects deenergization of the bus 301. Thus, the NOR element 2N2 (FIG. 6B) now has no input signal, and this element accordingly resets the MEMORY element 2M2 to cancel the second floor down corridor call.

After the elevator car stops, its door opens in a manner which will be apparent from the preceding discussion to permit the entry of the passenger who registered the corridor call for down service from the second floor. It will be assumed that such passenger presses the car call push button 1C (FIG. 6A). Such pressing results in the closure of the car door even if the non-interference time has not yet expired, as will be apparent from the foregoing discussion. In addition, such pressing results in the turning on of the MEMORY element 1M1 to energize the bus 315 through the OR element 1R3. When the push button 1C is released, the set input terminal of the MEMORY element 1M1 is deenergized, but the MEMORY element stores the car call to maintain the bus 315 energized.

After the car call for the first floor is registered and the elevator car door closes, the car accelerates downwardly from the second floor in a manner which will be apparent from the preceding discussion of the starting of the car from the fourth floor. When the inductor notching relay Z (FIG. 1) passes the inductor plate ZP1, the break contacts Z1 momentarily open to deenergize the bus 325. Such deenergization results in the termination of input energy to the NOR element 1N22 (FIG. 6A) to turn on the MEMORY element 1M4 through the OR element 1R5 and to reset the MEMORY element 2M4 (FIG. 6B) for the second floor by operation of the NOR element 2N24 and the OR element 2R6. In addition, the output voltage of the NOR element 1N22 (FIG. 6A) is applied to the bus 308 through the OR element 1R1. Energization of the bus 308 results in energization and pickup of the stopping relay 34 (FIG. 6F) to open the break contacts 34–1 (FIG. 1). As the car continues to move toward the first floor, the switch 17 opens to deenergize the down switch 2, and thus the elevator car stops accurately at the first floor.

After the car stops, its door opens to permit the departure of the passenger who registered the car call for the first floor. Subsequent to the expiration of the four-second non-interference time, the car door recloses, and the elevator car remains at the first floor until another call for service is registered.

It will be observed that when the car arrives at the first floor the cam-operated switch B69 (FIG. 6A) closes to maintain the MEMORY element 1M4 turned on through the OR element 1R5. In addition, closure of the swtich B69 results in energization of the bus 305 to maintain the respective MEMORY elements M4 for all floors above the first floor in reset condition. Furthermore, closure of the switch B69 results in the application of an input signal to the NOR element 1N1. When the down switch 2 (FIG. 1) dropped out, its make contacts 2–7 (FIG. 6F) opened to deenergize the bus 301. Consequently, the NOR element 1N2 (FIG. 6A) now has no input signal, and this element produces an output voltage to reset the MEMORY element 1M1 and thus to cancel the previously registered car call for the first floor.

It will be understood that although electromagnetic switches and relays are used to perform certain control functions in the present system (refer to FIGS. 1 and 6F), suitable static control means capable of switching the voltages associated therewith may be substituted therefor.

If the elevator system is to serve a structure having fewer than five landings, there will be a corresponding decrease in the number of groups of components associated with the intermediate floors (FIGS. 6B 6C and 6D) of the above-described system. If, on the other hand, the system is to serve a structure having greater than five landings, components similar to those employed for each intermediate floor in the present system would be employed for each additional landing. For example, if a mezzanine landing were located between the first and second landings, components similar to those employed for the second landing would be introduced between those shown for the first and second landings (FIGS. 6A and 6B, respectively). Likewise, appropriate changes would be made in the number and location of inductor plates for the inductor notching relay Z and of cams for the switch 17 of FIG. 1. The association of the added components with the remainder of the components will be understood from the foregoing discussion.

*Figure 7*

FIG. 7 illustrates a cabinet or rack in which components of the elevator control system hereinbefore described may be installed. The rack comprises a plurality of pairs of upright members 501, the members of each pair being interconnected by a cross member 503. Secured to the upright members 501 are a plurality of channels or tracks 505. It will be understood that a plurality of tracks similar to and in alignment with those visible in FIG. 7 are secured to the opposite side of the rack. Thus, the rack of FIG. 7, which is designed for an elevator system serving a maximum of eight floors, has ten pairs of tracks 505.

Inserted in the tracks 505 are a plurality of boards, on which are mounted components of the elevator control system hereinbefore described. These boards include a lower terminal or first floor board 507, a plurality of intermediate floor boards 509, an upper terminal floor board 511, a terminal circuit board 513 and a relay board 515. Each of the intermediate floor boards 509 is associated with a separate intermediate floor of the structure served by the elevator system. Thus, the lowermost intermediate floor board 509, as viewed in FIG. 7, is associated with the second floor; the middle intermediate floor board 509 is associated with the third floor; while the upper intermediate floor board 509 is associated with the fourth floor of the structure. It will be observed that the fourth floor board is partially withdrawn from the rack in order that the components thereof may be illustrated in greater detail.

On each of the floor boards and on the terminal circuit board are mounted the static components of the elevator control system respectively associated therewith. Such components are illustrated generally by broken lines. Hence, the lower terminal or first floor board 507 contains those static elements illustrated in FIG. 6A for the first floor; the intermediate floor boards 509 mount the static elements illustrated in FIGS. 6B, 6C and 6D for the second, third and fourth floors, respectively; the upper terminal floor board 511 contains the static elements illustrated in FIG. 6E for the fifth floor; and mounted on the terminal circuit board 513 are the terminal circuit static elements illustrated in FIG. 6F. Mounted on the relay board 515 and represented diagrammatically by boxes 516 are the electromagnetic relays 34, 45, 70, 81U and 81D illustrated in FIG. 6F.

Each of the aforementioned boards may be fabricated of suitable insulating material such as a phenolic resin, on the underside of which is printed circuitry appropriate for interconnecting the components mounted thereon, such interconnections being shown in FIGS. 1 and 6A through 6F. Each of the component boards is adapted to be inserted into an associated pair of the tracks 505, as is clearly illustrated in FIG. 7.

Referring now to the intermediate floor board 509 for the fourth floor, which is typical, each of the static elements mounted thereon may comprise a printed circuit board 517 on which is mounted the components associated therewith (not shown). The static elements are adapted to plug into the floor board 509 for interconnection by the printed circuitry on the underside thereof. To the right-hand end of the floor board, as viewed in FIG. 7, is secured a connector 519, which has a plurality of electroconductive pins 521. The pins 521 pass downwardly through the connector and through the floor board and are connected by suitable means such as soldering to appropriate points in the printed circuitry on the underside of the board. It will be understood that the terminal circuit board 513 and the relay board 515 each has a connector on the right-hand end thereof similar to the connector 519.

From the previous description of the circuitry of FIGS. 6B, 6C and 6D it will be appreciated that all of the intermediate floor boards 509 may be identical to one another. Likewise, it will be observed that the lower terminal floor board 507 and the upper terminal floor board 511, whose circuits are illustrated respectively in FIGS. 6A and 6E, may be identical to each other. Since the lower and upper terminal floor control circuits require relatively fewer static elements than those for the intermediate floors, the broken lines in FIG. 7 diagrammatically illustrate such requirements.

Mounted on the right-hand end of the rack, as viewed in FIG. 7, is an end board 523 having a plug-in connector for each of the remaining boards, such as a connector 525 for the fourth-floor board 509. The connector 525 has electroconductive sockets (not shown) adapted to receive the pins 521. The end board 523 may be fabricated of any suitable insulating material such as a phenolic resin on the outside of which is disposed printed circuitry, representative portions of which are illustrated by heavy lines 527. The sockets of the connector 525 are connected to the end board printed circuitry as by soldering. Such printed circuitry completes the interconnections among the floor, terminal circuit and relay boards, as represented by the buses 301 through 335 in FIGS. 6A through 6F, and furnishes terminal points for making connections between rack-mounted components and components external to the rack. Conveniently, external components such as the electromagnetic relays and switches of FIG. 1 may be mounted on a separate panel (with the exception of the inductor notching relay Z, which is mounted on the elevator car, as heretofore noted). Panels of this type are well known and it appears unnecessary, therefore, to illustrate or describe them further. Thus, wiring may be run between such a panel and the appropriate terminal points of the printed circuitry of the end board 523. Additionally, wire connections may be made from the corridor and car call push buttons and from the required power supplies (such as the B+ and B— supplies of FIG. 2B and the supply for the buses L— and L+ of FIGS. 1 and 6A through 6F) directly to suitable points of the printed circuitry of the end board 523.

It will be appreciated that for a rack constructed in accordance with the foregoing description no internal hand wiring is required for rack-mounted components, since all connections among such components are made with printed circuitry. Furthermore, it will be apparent that the use of plug-in connections for the relatively compact rack results in increased ease of servicing and maintenance, inasmuch as any board which is received by a pair of tracks 505 easily may be removed from the rack and a new board of identical components inserted in its place.

If additional points for external connections to rack-mounted components are desired, they may be effected through the use of a board 529, which may be mounted on two of the cross members 503. Secured to the board 529 may be one or more plugs 531. Use of the board 529 and the plugs 531 will require internal wiring (not shown) between the plugs and the end board 523.

It will be observed that, although the rack of FIG. 7 is designed for an elevator system serving a maximum of eight floors, the same rack may be employed for a system serving fewer than eight floors. Thus, for the five-floor system hereinbefore described, the upper three pairs of floor unit tracks 505 are left vacant.

Although the invention has been described with reference to certain specific embodiments thereof, numerous modifications falling within the spirit and scope of the invention are possible.

We claim as our invention:

1. In an elevator system for a structure having a plurality of landings, an elevator car, means mounting the elevator car for movement relative to the structure to serve the landings, and control means for moving the elevator car and for stopping the elevator car at predetermined landings, said control means including call registering means for registering calls for elevator service for each of the landings, said call registering means comprising an electrical static MEMORY element having an output dependent on the last of a plurality of inputs supplied thereto, means operable when energized for applying a first input to said MEMORY element to effect the production thereby of an output indicating the registration of a call for elevator service for a predetermined one of said landings, and means responsive to the stopping of the elevator car at the last-named landing for applying a second input to said MEMORY element for resetting said MEMORY element to cancel said call registration indication.

2. In an elevator system for a structure having a plurality of landings, an elevator car, means mounting the elevator car for movement relative to the structure to serve the landings, and control means for moving the elevator car and for stopping the elevator car at predetermined landings, said control means including call registering means for registering calls for elevator service for each of the landings, said call registering means comprising an electrical static MEMORY element having an output dependent on the last of a plurality of inputs supplied thereto, means operable when energized for applying a first input to said MEMORY element to effect the production thereby of an output indicating the registration of a call for elevator service for a predetermined one of said landings, means responsive to the stopping of the elevator car at the last-named landing for applying a second input to said MEMORY element for resetting said MEMORY element to cancel said call registration indication, and illuminating means responsive to said output of said MEMORY element for providing a visual indication of said call registration.

3. In an elevator system for a structure having a plurailty of landings, an elevator car, means mounting the elevator car for movement relative to the structure to serve the landings, and control means for moving the elevator car and for stopping the elevator car at predetermined landings, said control means including call registering means for registering calls for elevator service for each of the landings, said call registering means including an electrical static MEMORY element having an output dependent on the last of a plurality of inputs supplied thereto, said MEMORY element comprising a pair of electrical static NOR elements each having two input terminals, a first input terminal of each NOR element being coupled to the output terminal of the other NOR element, one of said output terminals being the output terminal of said MEMORY element, the second input terminals of said NOR elements comprising the input terminals of said MEMORY element, means operable when energized for applying an input to a first of said input terminals of said MEMORY element to effect the production thereby of an output at said one output terminal indicating the registration of a call for elevator service for a predetermined one of said landings, and means responsive to the stopping of the elevator car at the last-named landing for applying an input to the second of said input terminals of said MEMORY element for resetting said MEMORY element to cancel said call registration indication.

4. In an elevator system for a structure having a plurality of landings, an elevator car, means mounting the elevator car for movement relative to the structure to serve the landings, and control means for moving the elevator car and for stopping the elevator car at predetermined landings, said control means including call registering means for registering calls for elevator service for each of the landings, said call registering means including an electrical static MEMORY element having an output dependent on the last of a plurality of inputs supplied thereto, said MEMORY element comprising a pair of electrical static NOR elements each having two input terminals, a first input terminal of each NOR element being coupled to the output terminal of the other NOR element, one of said output terminals being the output terminal of said MEMORY element, the second input terminals of said NOR elements comprising the input terminals of said MEMORY element, means operable when energized for applying an input to a first of said input terminals of said MEMORY element to effect the production thereby of an output at said one output terminal indicating the registration of a call for elevator service for a predetermined one of said landings, means responsive to the stopping of the elevator car at the last-named landing for applying an input to the second of said input terminals of said MEMORY element for resetting said MEMORY element to cancel said call registration indication, and illuminating means coupled to said one output terminal for providing a visaul indication of said call registration.

5. In an elevator system for a structure having a plurality of landings, an elevator car for carrying load, means mounting the elevator car for movement in two directions relative to the structure to serve the landings, landing first call means operable from each of the landings for registering calls for elevator service in a first of said two directions of movement from the landings, landing second call means operable from each of the landings for registering calls for elevator service in the second of said two directions of movement from the landings, car call means operable for registering a call for each of the landings desired for load within the elevator car, said landing, first and second call means and said car call means for each landing each including an electrical static MEMORY element having an output dependent on the last of a plurality of inputs supplied thereto, said MEMORY element comprising a pair of electrical static NOR elements each having two input terminals, a first input terminal of each NOR element being coupled to the output terminal of the other NOR element, one of said output terminals being the output terminal of said MEMORY element, the second input terminals of said NOR elements comprising the input terminals of said MEMORY element, means operable when energized for applying an input to a first of said input terminals of said MEMORY element to effect the production thereby of an output indicating the registration of the desired call for service for the associated landing, control means for operating the elevator car for travel in said two directions and for stopping the elevator car at each of the landings for which a call for service is registered by said landing first or second call means or by said car call means, a resetting NOR element for each landing, means for generating a first signal when the elevator car is moving, means for generating a second signal when the elevator car is not located adjacent the landing associated with said resetting NOR element, means for energizing said resetting NOR element with said first and second signals, and means coupling the output of said resetting NOR element to the second input terminal of each of the call registering MEMORY elements for the associated landing, whereby said resetting NOR element applies a resetting input signal to each of the last-named MEMORY elements when the elevator car stops at the landing associated therewith.

6. In an elevator system for a structure having a plurality of landings, an eleevator car, means mounting the elevator car for movement relative to the structure in a first direction and in a second direction opposite to said first direction to serve the landings, motive means for moving the elevator car, and stopping means for stopping the elevator car, said stopping means including a separate electrical static element for each of the landings, said static element having a first electrical condition and a second electrical condition, call registering means for registering calls for elevator service for each of the landings, means responsive to the registration of a call for each landing by said call registering means and to the positioning of the elevator car adjacent the last-named landing for operating the corresponding static element for the last-named landing from its first to its second condition, and means responsive to the operation of the last-named static element for stopping the elevator car at the corresponding landing.

7. In an elevator system for a structure having a plurality of landings, an elevator car, means mounting the elevator car for movement relative to the structure in a first direction and in a second direction opposite to said first direction to serve the landings, motive means for moving the elevator car, and stopping means for stopping the elevator car, said stopping means including call registering means for registering calls for elevator service for each of the landings, a separate electrical static NOR element for each of the landings, said NOR element having a plurality of input conditions which must be satisfied to produce an output, a first one of said input conditions representing the registration of a call for elevator service by said call registering means for the landing with which said NOR element is associated, a second one of said input conditions representing a positioning of the elevator car adjacent the associated landing, common static means responsive to the output of each of said NOR elements, and means responsive to the operation of said common static means for stopping the elevator car at the landing associated with the last-named NOR element.

8. In an elevator system for a structure having a plurality of landings, an elevator car, means mounting the elevator car for movement relative to the structure in a first direction and in a second direction opposite to said first direction to serve the landings, motive means for moving the elevator car, and stopping means for stopping the elevator car, said stopping means including call registering means for registering calls for elevator service for each of the landings, a separate electrical static NOR element for each of the landings, said NOR element having a plurality of input conditions which must be satisfied to produce an output, a first one of said input conditions representing the registration of a call for elevator service by said call registering means for the landing with which said NOR element is associated, a second one of said input conditions representing a positioning of the elevator car adjacent the associated landing, a MEMORY element, means responsive to the output of each of said NOR elements for operating said MEMORY element, means responsive to the operation of said MEMORY element for stopping the elevator car at the landing associated with the last-named NOR element, and means responsive to such stopping for resetting said MEMORY element.

9. In an elevator system for a structure having a plurality of landings, an elevator car for carrying load, means mounting the elevator car for movement relative to the structure in a first direction and in a second direction opposite to said first direction to serve the landings, motive means for moving the elevator car, and stopping means for stopping the elevator car, said stopping means including landing first call means operable from each of the landings for registering calls for elevator service in a first of said two directions of movement from the landings, landing second call means operable from each of the landings for registering calls for elevator service in the second of said two directions of movement from the landings, car call means operable for registering a call for each of the landings desired for load within the elevator car, separate first, second and third NOR elements for each of the landings, each of said NOR elements having a plurality of input conditions which must be satisfied to effect the production of an output thereby, a first one of said input conditions for each NOR element representing a positioning of the elevator car adjacent the associated landing, a second one of said input conditions for each of said first NOR elements representing the registration of a call for elevator service by said landing first call means for the associated landing, a third one of said input conditions for each of said first NOR elements representing the first direction of movement of the elevator car, a second one of said input conditions for each of said second NOR elements representing the registration of a call for elevator service by said landing second call means for the associated landing, a third one of said input conditions for each of said second NOR elements representing the second direction of movement of the elevator car, a second of said input conditions for each of said third NOR elements comprising the registration of a call for elevator service by said car call means for the associated landing, a MEMORY element, means responsive to the output of each of said NOR elements for operating said MEMORY element, means responsive to the operation of said MEMORY element for stopping the elevator car at the landing associated with the last-named NOR element, and means responsive to such stopping for resetting said MEMORY element.

10. In an elevator system for a structure having a plurality of landings, an elevator car, means mounting the elevator car for vertical movement relative to the structure in a first direction and in a second direction opposite to said first direction to serve the landings, motive means for moving the elevator car, and control means operable in cooperation with the motive means for moving the elevator car and for stopping the elevator car at predetermined landings, said control means including a separate electrical static element for each of the landings, said static element having a first electrical condition and a second electrical condition, call registering means for registering calls for elevator service for each of the landings, means responsive to the registration of a call for each landing by said call registering means and to the vertical position of the elevator car with respect to the last-named landing for operating the corresponding static element for the last-named landing from the first condition to the second condition, and means responsive to the operation of the last-named element for operating the motive means to move the elevator car in the proper direction to serve the last-named landing.

11. In an elevator system for a structure having a plurality of landings, an elevator car, means mounting the elevator car for vertical movement relative to the structure in a first direction and in a second direction opposite to said first direction to serve the landings, motive means for moving the elevator car, and control means operable in cooperation with the motive means for moving the elevator car and for stopping the elevator car at predetermined landings, said control means including call registering means for registering calls for elevator service for each of the landings, a separate electrical static NOR element for each of the landings, said NOR element having a plurality of input conditions which must be satisfied to produce an output, a first one of said input conditions representing the registration of a call for elevator service by said call registering means for the landing with which said NOR element is associated, a second one of said input conditions representing the vertical position of the elevator car relative to the associated landing, common static means responsive to the output of each of said NOR elements, and means responsive to the output of said common static means for operating the motive means to move the elevator car in the proper direction to serve the landing associated with the last-named NOR element.

12. In an elevator system for a structure having a plurality of landings, an elevator car, means mounting the elevator car for vertical movement relative to the structure in a first direction and in a second direction opposite to said first direction to serve the landings, motive means for moving the elevator car, and control means operable in cooperation with the motive means for moving the elevator car and for stopping the elevator car at predetermined landings, said control means including call registering means for registering calls for elevator service for each of the landings, a separate electrical static NOR element for each of the landings, said NOR element having a plurality of input conditions which must be satisfied to produce an output, a first one of said input conditions representing the registration of a call for elevator service by said call registering means for the landing with which said NOR element is associated, a second one of said input conditions representing the vertical position of the elevator car relative to the associated landing, a MEMORY element, means responsive to the output of each of said NOR elements for operating said MEMORY element, means responsive to the operation of said MEMORY element for operating the motive means to move the elevator car in the proper direction to serve the landing associated with the last-named NOR element, and means responsive to the stopping of the elevator car at the last-named landing for resetting said MEMORY element provided no call for service is registered requiring further travel of the elevator car in the last-named direction.

13. In an elevator system for a structure having a plurality of landings, an elevator car for carrying load, means mounting the elevator car for movement relative to the structure in up and down directions to serve the landings, motive means for moving the elevator car, and control means operable in cooperation with the motive means for moving the elevator car and for stopping the elevator car at predetermined landings, said control means including landing up call means operable from each of the landings for registering calls for elevator service in the up direction of movement from the landings, landing down call means operable from each of the landings for registering calls for elevator service in the down direction of movement from the landings, car call means operable for registering a call for each of the landings desired for load within the elevator car, separate first and second groups of NOR elements for each of the landings, each of said groups comprising three NOR elements each having two input conditions which must be satisfied to effect the production of an output thereby, a first one of said input conditions for a first NOR element of each group representing the registration of a call for elevator service by said landing up call means for the associated landing, a first one of said input conditions for a second NOR element of each group representing the registration of a call for elevator service by said landing down call means for the associated landing, a first one of said input conditions for the third NOR element of each group representing the registration of a call for elevator service by said car call means for the associated landing, the second one of said input conditions for the first and third NOR elements of each first group representing a positioning of the elevator car at or below the associated landing, the second one of said input conditions for the second NOR element of each first group representing a positioning of the elevator car below the associated landing, the second one of said input conditions for the first NOR element of each second group representing a positioning of the elevator car above the associated landing, the second one of said input conditions for the second and third NOR elements of each second group representing a positioning of the elevator car at or above the associated landing, a first MEMORY element and a second MEMORY element, means responsive to the output of each of the NOR elements of each first group for operating said first MEMORY element, means responsive to the operation of said first MEMORY element for operating the motive means to move the elevator car in the up direction, means responsive to the output of each of the NOR elements of each second group for operating said second MEMORY element, means responsive to the operation of said second MEMORY element for operating the motive means to move the elevator car in the down direction, and means responsive to the stopping of the elevator car at each landing for which a call is registered by said landing up or down call means or by said car call means for resetting the MEMORY element in response to whose operation the elevator car traveled to the last-named landing provided no call for service is registered requiring further movement of the elevator car in the same direction of travel.

14. In an elevator system for a structure having a plurality of landings, an elevator car, means mounting the elevator car for movement relative to the structure to serve the landings, means for producing pulses dependent on car movement, static units respectively corresponding to said landings arranged in a chain, each of said static units having energized and deenergized conditions, means responsive to each of said pulses for stepping one of the conditions of said static units to the unit corresponding to the position of the elevator car relative to said structure, static means for each of said landings having energized and deenergized conditions, passenger-operated means for placing each of said static means in one of its conditions, and means responsive to the coincidence of predetermined conditions of the static unit and the static means for each landing for controlling movement of the elevator car.

15. In an elevator system for a structure having a plurality of landings, an elevator car, means mounting the elevator car for movement relative to the structure to serve the landings, and landing selector means comprising separate first and second NOR elements for each of the landings, each of said NOR elements having a plurality of input conditions which must be satisfied to effect the production of an output thereby, a first one of said input conditions for each of said first and second NOR elements representing a predetermined direction of movement for which the elevator car is set, a second one of said input conditions for each of said first NOR elements representing car position relative to successive landings, a third one of said input conditions for each of said first NOR elements representing a first position of the elevator car, a second one of said input conditions for each of said second NOR elements representing a second position of the elevator car, a separate MEMORY element for each of the landings, means responsive to the output of each first NOR element for transferring the MEMORY element for the associated landing from a first condition to a second condition, and means responsive to the output of the second NOR element for the last-named landing for transferring the associated MEMORY element from said second condition to said first condition, whereby the condition of each MEMORY element represents a positioning of the elevator car with respect to the associated landing.

16. In an elevator system for a structure having a plurality of vertically-spaced landings, an elevator car, means mounting the elevator car for movement in up and down directions relative to the structure to serve the landings, and landing selector means comprising separate first and second NOR elements for each of the landings, each of said NOR elements having a plurality of input conditions which must be satisfied to effect the production of an output thereby, a separate MEMORY element for each of the landings, means responsive to the output of either NOR element for each of the landings for transferring the associated MEMORY element from a first condition to a second condition, a first one of said input conditions for each of said first NOR elements representing the up direction of movement for which the elevator car is set, a second one of said input conditions for the first NOR element for one of said landings indicating that the MEMORY element for the next landing below said one landing has operated to its second condition, a third one of said input conditions for the last-named first NOR element representing a positioning of the elevator car between said one landing and said next landing therebelow, a first one of said input conditions for each of said second NOR elements representing the down direction of movement for which the elevator car is set, a second one of said input conditions for the second NOR element for said one landing indicating that the MEMORY element for the next landing above said one landing has operated to its second condition, a third one of said input conditions for the last-named second NOR element representing a positioning of the elevator car between said one landing and said next landing thereabove, means responsive to the up direction of movement for which the elevator car is set and to the operation of the MEMORY element for said next landing above said one landing to its second condition for operating the MEMORY element for said one landing from its second condition to its first condition, and means responsive to the down direction of movement for which the elevator car is set and to the operation of the MEMORY element for said next landing below said one landing to its second condition for operating the MEMORY element for said one landing from its second condition to its first condition.

17. In an elevator system for a structure having a plurality of vertically-spaced landings, an elevator car, means mounting the elevator car for movement in up and down directions relative to the structure to serve the landings, and landing selection means comprising a separate first and a separate second NOR element for each of the landings at which the elevator car may stop during travel in the up direction, a separate third and a separate fourth NOR element for each of the landings at which the elevator car may stop during travel in the down direction, each of said NOR elements having a plurality of input conditions which must be satisfied to effect the production of an output thereby, a separate MEMORY element for each of the landings, means responsive to the output of each of the first and third NOR elements for any of the landings for transferring the MEMORY element for such landing from a first condition to a second condition, and means responsive to the output of each of the second and fourth NOR elements for any of the landings for transferring the MEMORY element for such landing from said second to said first condition, a first one of said input conditions for each of said first and fourth NOR elements representing the up direction of movement for which the elevator car is set, a first one of said input conditions for each of said second and third NOR elements representing the down direction of movement for which the elevator car is set, a second one of said input conditions for the first and second NOR elements for one of said landings indicating that the MEMORY element for the next landing below said one landing has operated to its second condition, a second one of said input conditions for the third and fourth NOR elements for said one landing indicating that the MEMORY element for the next landing above said one landing has operated to its second condition, a third one of said input conditions for the first NOR element for said one landing representing a positioning of the elevator car between said one landing and said next landing therebelow, and a third one of said input conditions for the third NOR element for said one landing representing a positioning of the elevator car between said one landing and said next landing thereabove.

18. In an elevator system for a structure having a plurality of landings, an elevator car having an entranceway, a door, means mounting the door for movement relative to the elevator car to close and to expose said car entranceway at each of said landings, door control means for moving said door, means mounting the elevator car for movement relative to the structure to serve the landings, and car control means for moving the elevator car and for stopping the elevator car at predetermined landings, said door control means comprising an electrical static element having a first electrical condition and a second electrical condition, means responsive to a stopping operation of the elevator car at each of the landings for operating said static element from its first to its second condition, and means responsive to the operation of said static element to said second condition for opening said door to expose said elevator car entranceway.

19. In an elevator system for a structure having a plurality of landings, an elevator car having an entranceway, a door, means mounting the door for movement relative to the elevator car between fully open and fully closed positions to expose and to close said car entranceway at each of said landings, door control means for moving said door, means mounting the elevator car for movement relative to the structure to serve the landings, and car control means for moving the elevator car and for stopping the elevator car at predetermined landings, said door control means comprising an electrical static NOR element having a first electrical condition and a second electrical condition, means responsive to a stopping operation of the elevator car at each of said landings for operating said NOR element from the first condition to the second condition, means responsive to the operation of said NOR element to said second condition for opening said door to expose said elevator car entranceway, means responsive to the arrival of the door at its fully open position and to the lapse of a predetermined time delay subsequent to said arrival for operating said NOR element from said second to said first condition, means for effecting said time delay, and means responsive to the operation of said NOR element to said first condition for closing said door.

20. In an elevator system for a structure having a plurality of landings, an elevator car having an entranceway, a door, means mounting the door for movement relative to the elevator car between fully open and fully closed positions to expose and to close said car entranceway at each of said landings, door control means for moving said door, means mounting the elevator car for movement relative to the structure to serve the landings, and car control means for moving the elevator car and for stopping the elevator car at predetermined landings, said door control means comprising an electrical static NOR element having a first electrical condition and a second electrical condition, means responsive to a stopping operation of the elevator car at each of said landings for operating said NOR element from the first condition to the second condition, means responsive to the operation of said NOR element to said second condition for opening said door to expose said elevator car entranceway, a DELAY element for interposing a predetermined time delay between the application thereto of an input and the production thereby of an output, means responsive to the arrival of the door at its fully open position for applying an input to said DELAY element, means responsive to the production of an output by said DELAY element after the expiration of said predetermined time delay and to the positioning of the door at its fully open position for operating said NOR element from said second to said first condition, and means responsive to the operation of said NOR element to said first condition for closing said door.

21. In an elevator system for a structure having a plurality of landings, an elevator car having an entranceway, a door, means mounting the door for movement relative to the elevator car between fully open and fully closed positions to expose and to close said car entranceway at each of said landings, door control means for moving said door, means mounting the elevator car for movement relative to the structure to serve the landings, car control means for moving the elevator car and for stopping the elevator car at predetermined landings, and car call means operable from the elevator car for registering a call for each of the landings desired for load within the elevator car, said door control means comprising an electrical static NOR element having a first electrical condition and a second electrical condition, means responsive to a stopping operation of the elevator car at each of said landings for operating said NOR element from the first condition to the second condition, means responsive to the operation of said NOR element to said second condition for opening said door to expose said elevator car entranceway, means responsive to the arrival of the door at its fully open position and to the lapse of a predetermined time delay subsequent to said arrival for operating said NOR element from said second to said first condition, delay means for effecting said time delay, an electrical static MEMORY element having a first electrical condition and a second electrical condition, means responsive to the operation of said car call means for operating said MEMORY element from its first to its second condition when said door is away from its fully closed position, means responsive to the operation of said MEMORY element to its second condition for rendering said delay means ineffective further to delay the operation of said NOR element from its second condition to its first condition after said door has reached its fully open position, means responsive to the operation of said NOR element to its first condition for closing said door, and means responsive to movement of the elevator car by said car control means for operating said MEMORY element from its second to its first condition.

22. In an elevator system for a structure having a plurality of landings, an elevator car having an entranceway, a door, means mounting the door for movement relative to the elevator car between fully open and fully closed positions to expose and to close said car entranceway at each of said landings, door control means for moving said door, means mounting the elevator car for movement relative to the structure to serve the landings, car control means for moving the elevator car and for stopping the elevator car at predetermined landings, and car call means operable from the elevator car for registering a call for each of the landings desired for load within the elevator car, said door control means comprising first, second, third and fourth electrical static NOR elements each having a first electrical condition and a second electrical condition, means responsive to a stopping operation of the elevator car at each of said landings for operating said first NOR element from its first to its second condition, means responsive to the operation of said first NOR element to its second condition for opening said door to expose said elevator car entranceway, means responsive to the arrival of said door at its fully open position for operating said second NOR element from its first to its second condition, a DELAY element for interposing a predetermined time delay between the application thereto of an input and the production thereby of an output, means responsive to the operation of said second NOR element to its second condition for applying an input to said DELAY element, means responsive to the production of an output by said DELAY element after the expiration of said predetermined time delay for operating said third NOR element from its first to its second condition, means responsive to the operation of said third NOR element to its second condition for operating said first NOR element from its second to its first condition, means responsive to the operation of said car call means when said door is away from its fully closed position for operating said fourth NOR element from its first to its second condition, an electrical static MEMORY element having a first electrical condition and a second electrical condition, means responsive to the operation of said fourth NOR element to its second condition for operating said MEMORY element from its first to its second condition, means responsive to the operation of said MEMORY element to its second condition for operating said third NOR element from its second to its first condition although said predetermined time delay has not expired, means responsive to the operation of said first NOR element to its first condition for closing said door, and means responsive to the movement of the elevator car by said car control means for operating said MEMORY element from its second to its first condition.

23. In an elevator system for a structure having a plurality of landings, an elevator car having an entranceway, a door, means mounting the door for movement relative to the elevator car to close and to expose said car entranceway at each of said landings, door control means for moving said door, means mounting the elevator car for movement relative to the structure to serve the landings, car control means for moving the elevator car and for stopping the elevator car at predetermined landings, and landing call means for each of the landings operable from the associated landing for registering calls for elevator service from the associated landing, said door control means comprising an electrical static element having a first electrical condition and a second electrical condition, means responsive to the operation of said landing call means for each of the landings subsequent to the stopping of the elevator car at such landing for operating said static element from its first to its second condition, and means responsive to the operation of said static element to said second condition for opening said door to expose said elevator car entranceway.

24. In an elevator system for a structure having a plurality of landings, an elevator car having an entranceway, a door, means mounting the door for movement relative to the elevator car to close and to expose said car entranceway at each of said landings, door control means for moving said door, means mounting the elevator car for movement relative to the structure to serve the landings, car control means for moving the elevator car and for stopping the elevator car at predetermined landings, and landing call means for each of the landings operable from the associated landing for registering calls for elevator service from the associated landing, said door control means including a NOR element having a plurality of input conditions which must be satisfied to produce an output thereby, a first of said input conditions representing a stopping operation of the elevator car at any of said landings, a second of said input conditions representing the operation of said landing call means for the last-named landing subsequent to the stopping of the elevator car at such landing, and means responsive to the output of said NOR element for opening said door to expose said elevator car entranceway.

25. In an elevator system for a structure having a plurality of landings, an elevator car having an entranceway, a door, means mounting the door for movement relative to the elevator car to close and to expose said car entranceway at each of said landings, door control means for moving said door, means mounting the elevator car for movement relative to the structure to serve the landings, car control means for moving the elevator car and for stopping the elevator car at predetermined landings, and landing call means for each of the landings operable from the associated landing for registering calls for elevator service from the associated landing, said door control means including a separate first NOR element for each of the landings and a second NOR element, each of said NOR elements having a first electrical condition and a second electrical condition, means responsive to the operation of said landing call means for each landing and to a positioning of the elevator car adjacent the last-named landing for operating the first NOR element for such landing from its first to its second condition, means responsive to the operation of the last-named first NOR element to its second condition subsequent to the stopping of the elevator car at said last-named landing for operating said second NOR element from its first to its second condition, and means responsive to the operation of said second NOR element to its second condition for opening said door to expose said elevator car entranceway.

26. In an elevator system for a structure having a plurality of landings, an elevator car having an entranceway, a door, means mounting the door for movement relative to the elevator car to close and to expose said car entranceway at each of said landings, door control means for moving said door, means mounting the elevator car for movement relative to the structure to serve the landings, car control means for moving the elevator car and for stopping the elevator car at predetermined landings, landing first call means for each of the landings operable from the associated landing for registering calls for elevator service in a first direction of movement from the associated landing, landing second call means for each of the landings operable from the associated landing for registering calls for elevator service in a second direction of movement opposite to said first direction from the associated landing, a separate first and a separate second NOR element for each of the landings, a third and a fourth NOR element, each of said NOR elements having a first electrical condition and a second electrical condition, means responsive to the operation of either of said landing call means for each of the landings for operating the first NOR element for the associated landing from its first to its second condition, means responsive to the operation of the last-named first NOR element to its second condition and to a positioning of the elevator car adjacent said associated landing for operating the second NOR element for such landing from its first to its second condition, means responsive to the operation of the last-named second NOR element to its second condition subsequent to the stopping of the elevator car at said associated landing for operating said third NOR element from its first to its second condition, means responsive to the operation of said third NOR element to its second condition for operating said fourth NOR element from its first to its second condition, and means responsive to the operation of said fourth NOR element to its second condition for opening said door to expose said elevator car entranceway.

27. In an elevator system for a structure having a plurality of landings, an elevator car having an entranceway, a door, means mounting the door for movement relative to the elevator car to close and to expose said car entranceway at each of said landings, means mounting the elevator car for movement in up and down directions relative to the structure to serve the landings, and control means for controlling movement of the elevator car and of said door, said control means comprising call registering means for registering calls for elevator service for each of the landings, landing selector means responsive to car position, direction determining means for controlling the direction of movement of the elevator car, stopping means for stopping the elevator car at each of the landings, and door control means for opening and closing said door, each of said call registering means, landing selector means, direction determining means, stopping means and door control means comprising a plurality of electrical static NOR elements.

28. In an elevator system for a structure having a plurality of landings, an elevator car having an entranceway, a door, means mounting the door for movement relative to the elevator car to close and to expose said car entranceway at each of said landings, means mounting the elevator car for movement in up and down directions relative to the structure to serve the landings, control means for controlling movement of the elevator car and of said door, said control means comprising call registering means for registering calls for elevator service for each of the landings, landing selector means responsive to car position, direction determining means for controlling the direction of movement of the elevator car, stopping means for stopping the elevator car at each of the landings, and door control means for opening and closing said door, each of said call registering means, landing selector means, direction determining means and stopping means comprising a plurality of electrical static NOR elements and a plurality of electrical static MEMORY elements, said door control means including a plurality of electrical static NOR elements and an electrical static MEMORY element, each of said MEMORY elements having an output dependent on the last of a plurality of inputs supplied thereto, and separate illuminating means for each of predetermined ones of said MEMORY elements, each of said illuminating means being responsive to the output of its associated MEMORY element for providing a visual indication thereof.

29. A control assembly for controlling the movement of load transporting means relative to a plurality of spaced locations, said control assembly comprising a first unit, a plurality of second units respectively corresponding to said locations, each of said second units being transverse to said first unit, each of said second units including a plurality of electrical control elements specific to the corresponding one of said locations, common electrical control elements associated with said first unit, and detachable electrical connections between each of said second units and said first unit for connecting control elements associated with the last-named second unit to said common control elements.

30. A control assembly for controlling the movement of load transporting means relative to a plurality of spaced locations including a first location, a second location and a plurality of locations intermediate said first and second locations, said control assembly comprising a first unit, a plurality of second units respectively corresponding to said locations, each of said second units being transverse to said first unit, each of said second units including a plurality of electrical control elements specific to the corresponding one of said locations, the second units respectively corresponding to said first and second locations being identical to each other, the second units respectively corresponding to said intermediate locations being identical to one another, common electrical control elements associated with said first unit, and detachable electrical connections between each of said second units and said first unit for connecting control elements associated with the last-named second unit to said common control elements.

31. A control assembly for controlling the movement of an elevator car relative to a structure having a plurality of landings including a first landing, a second landing and a plurality of landings intermediate said first and second landings, said control assembly including a first unit, a plurality of second units respectively corresponding to said landings, each of said second units being transverse to said first unit, each of said second units including a plurality of electrical control elements specific to the corresponding one of said landings, said second units being disposed with respect to one another in the same sequential arrangement as said landings, the second units respectively corresponding to said first and second landings being identical to each other, the second units respectively corresponding to said intermediate landings being identical to one another, common electrical control elements associated with said first unit, and detachable electrical connections between each of said second units and said first unit for connecting control elements associated with the last-named second unit to said common control elements.

32. In an elevator system for a structure having a plurality of landings, an elevator car, means mounting the elevator car for movement relative to the structure to serve the landings, control means for moving the elevator car and for stopping the elevator car at predetermined landings, said control means comprising a separate group of electrical static elements for each of said landings, each of said groups including static elements for controlling the stopping of the elevator car at the associated landing, and separate support means mounting each of said groups of elements.

33. In an elevator system for a structure having a plurality of landings, an elevator car, means mounting the elevator car for movement relative to the structure to serve the landings, control means for moving the elevator car and for stopping the elevator car at predetermined landings, said control means comprising a separate group of electrical static elements for each of said landings, each of said groups including static elements for controlling the stopping of the elevator car at the associated landing, and a rack supporting said elements, said rack having separate support means for each of said groups of elements.

34. In an elevator system for a structure having a plurality of landings, an elevator car, means mounting the elevator car for movement relative to the structure to serve the landings, control means for moving the elevator car and for stopping the elevator car at predetermined landings, said control means comprising a separate group of control components for each of said landings, each of said groups including static elements for controlling the stopping of the elevator car at the associated landing, separate mounting means mounting each of said groups of control components, and a rack comprising separate support means for each separately mounted group of control components, said rack including means for interconnecting control components associated with different ones of said landings.

35. In an elevator system for a structure having a plurality of landings, an elevator car, means mounting the elevator car for movement relative to the structure to serve the landings, control means for moving the elevator car and for stopping the elevator car at predetermined landings, said control means comprising a separate group of control components for each of said landings, separate mounting means mounting each of said groups of control components, circuit means for each group of mounted control components, a rack for supporting said mounting means, said rack having separate support means for each of said mounting means, said rack including circuit means for interconnecting control components associated with different ones of said landings, and means for detachably securing the circuit means for each group of mounted control components to the circuit means of said rack.

36. In an elevator system for a structure having a plurality of landings, an elevator car, means mounting the elevator car for movement relative to the structure to serve the landings, control means for moving the elevator car and for stopping the elevator car at predetermined landings, said control means comprising a separate group of control components for each of said landings, a separate board mounting each of said groups of control components, each of said boards having circuit means interconnecting the control components associated therewith, a plurality of connectors secured to the circuit means of each of said boards, and a rack for supporting said boards, said rack having separate support means for receiving and supporting each of said boards, said rack including circuit means for interconnecting control components associated with different ones of said landings, said rack having a plurality of connectors for effecting detachable connections between the circuit means thereof and the connectors associated with said boards.

37. In an elevator system for a structure having a plurality of vertically-spaced landings including an upper terminal landing, a lower terminal landing and a plurality of intermediate landings, an elevator car having an entranceway, a door, means mounting the door for movement relative to the elevator car to close and to expose said car entranceway, means mounting the elevator car for movement in up and down directions relative to the structure to serve the landings, control means for controlling movement of the elevator car and of said door, said control means comprising a separate group of control components for each of said landings, each of said groups including control components for registering calls for elevator service for the associated landing, for determining the position of the elevator car relative to the associated landing, for controlling the direction of movement of the car, for stopping the car at the associated landing, and for opening and closing said door, a separate landing control component board mounting the group of control components for each of the landings, each of said landing boards having circuit means for interconnecting the control components associated therewith, a terminal circuit board of control components having circuit means for completing circuits common to said landing boards, for further controlling the direction of movement of the elevator car, for stopping the car at each of said landings, and for further controlling movement of said door, a plurality of connectors secured to the circuit means of each of said landing and terminal circuit boards, and a rack for supporting said landing and terminal circuit boards, said rack having separate support means for receiving and supporting each of said landing and terminal circuit boards, said rack including circuit means for interconnecting control components associated with said terminal circuit board and with different ones of said landing boards, said rack having a plurality of connectors for effecting detachable connections between the circuit means thereof and the connectors associated with said landing and terminal circuit boards.

38. In an elevator system for a structure having a plurality of vertically-spaced landings including an upper terminal landing, a lower terminal landing and a plurality of intermediate landings, an elevator car having an entranceway, a door, means mounting the door for movement relative to the elevator car to close and to expose said car entranceway, means mounting the elevator car for movement in up and down directions relative to the structure to serve the landings, control means for controlling movement of the elevator car and of said door, said control means comprising a separate group of control components for each of said landings, each of said groups including control components for registering calls for elevator service for the associated landing, for determining the position of the elevator car relative to the associated landing, for controlling the direction of movement of the car, for stopping the car at the associated landing, and for opening and closing said door, a separate landing control component board mounting the group of control components for each of the landings, each of said landing boards having circuit means for interconnecting the control components associated therewith, a terminal circuit board of control components having circuit means for completing circuits common to said landing boards, for further controlling the direction of movement of the elevator car, for stopping the car at each of said landings, and for further controlling movement of said door, said landing and terminal circuit board control components comprising electrical static NOR elements, a plurality of connectors secured to the circuit means of each of said landing and terminal circuit boards, and a rack for supporting said landing and terminal circuit boards, said rack having separate support means for receiving and supporting each of said landing and terminal circuit boards, said rack including circuit means for interconnecting control components associated with said terminal circuit board and with different ones of said landing boards, said rack having a plurality of connectors for effecting detachable connections between the circuit means thereof and the connectors associated with said landing and terminal circuit boards.

References Cited in the file of this patent

UNITED STATES PATENTS 2,482,529    Williams                Sept. 20, 1949